(12) United States Patent
Van Slyke et al.

(10) Patent No.: US 7,580,872 B2
(45) Date of Patent: Aug. 25, 2009

(54) LIQUID INSURANCE CONTRACTS

(75) Inventors: Oakley E. Van Slyke, San Clemente, CA (US); Brian L. Whitworth, Malibu, CA (US)

(73) Assignee: LIC Development LLC, San Clemente, CA (US)

( * ) Notice: Subject to any disclaimer, the term of this patent is extended or adjusted under 35 U.S.C. 154(b) by 1609 days.

(21) Appl. No.: 09/971,492

(22) Filed: Oct. 5, 2001

(65) Prior Publication Data

US 2002/0042770 A1    Apr. 11, 2002

Related U.S. Application Data

(60) Provisional application No. 60/238,798, filed on Oct. 6, 2000.

(51) Int. Cl.
  *G06Q 40/00*     (2006.01)
(52) U.S. Cl. ............................................. 705/35; 705/4
(58) Field of Classification Search ............... 705/36 R, 705/36 T, 35–37, 39–40, 4; 902/41; 235/1 R
  See application file for complete search history.

(56) References Cited

U.S. PATENT DOCUMENTS

| | | | | |
|---|---|---|---|---|
| 4,752,877 A * | 6/1988 | Roberts et al. | ............ | 705/36 R |
| 4,766,539 A * | 8/1988 | Fox | ............... | 705/4 |
| 5,101,353 A * | 3/1992 | Lupien et al. | ................. | 705/37 |
| 5,704,045 A * | 12/1997 | King et al. | ..................... | 705/35 |
| 5,966,700 A | 10/1999 | Gould et al. | ................. | 705/38 |
| 5,970,479 A | 10/1999 | Shepherd | ..................... | 705/37 |
| 5,974,390 A | 10/1999 | Ross | ............................. | 705/4 |
| 6,009,402 A * | 12/1999 | Whitworth | .................... | 705/4 |
| 6,026,364 A * | 2/2000 | Whitworth | ................ | 705/36 R |
| 6,035,287 A | 3/2000 | Stallaert et al. | ............... | 705/37 |
| 6,049,772 A | 4/2000 | Payne et al. | ..................... | 705/4 |
| 6,119,093 A * | 9/2000 | Walker et al. | .................. | 705/4 |
| 6,134,536 A | 10/2000 | Shepherd | ..................... | 705/37 |
| 6,470,321 B1 * | 10/2002 | Cumming et al. | ............. | 705/4 |
| 6,594,635 B1 * | 7/2003 | Erlanger | ........................ | 705/4 |
| 6,622,129 B1 * | 9/2003 | Whitworth | .................. | 705/37 |
| 7,047,218 B1 * | 5/2006 | Wallman | ................. | 705/36 R |
| 2004/0111358 A1 * | 6/2004 | Lange et al. | .................. | 705/37 |
| 2005/0080705 A1 * | 4/2005 | Chaganti | ..................... | 705/36 |

OTHER PUBLICATIONS

"The Changing Nature of Risk and the Challenges to Sound Risk Management in the New Global Financial Landscape", Financial Market Trends, Feb. 2000.*

* cited by examiner

*Primary Examiner*—Mary Cheung
(74) *Attorney, Agent, or Firm*—Vic Lin; Myers Andras Sherman LLP

(57) ABSTRACT

A liquid insurance contract (LIC) comprises a security which is traded or tradable and which has cash flows to the issuer based upon a liability whose exact value is unknown at the time of issuance. A method for creating and trading these LICs, as well as other financial products derived from LICs, may include any of the following steps: writing at least one LIC; preparing regulatory filings for at least two LICs; issuing the two LICs; preparing regulatory filings for a financial product which includes at least one detachable LIC provision; issuing the financial product; creating at least one underwriter as a closed end fund owned by a parent company; placing ownership of at least a portion of an issue of the financial product in an underwriter owned by a parent company; spinning off the underwriter from the parent company using at least one stock dividend; trading shares of the underwriter; reporting information on trades and positions of the underwriter; and valuing the underwriter using analytic modeling, sensitivity testing, portfolio analysis, and/or investment analysis.

48 Claims, 26 Drawing Sheets

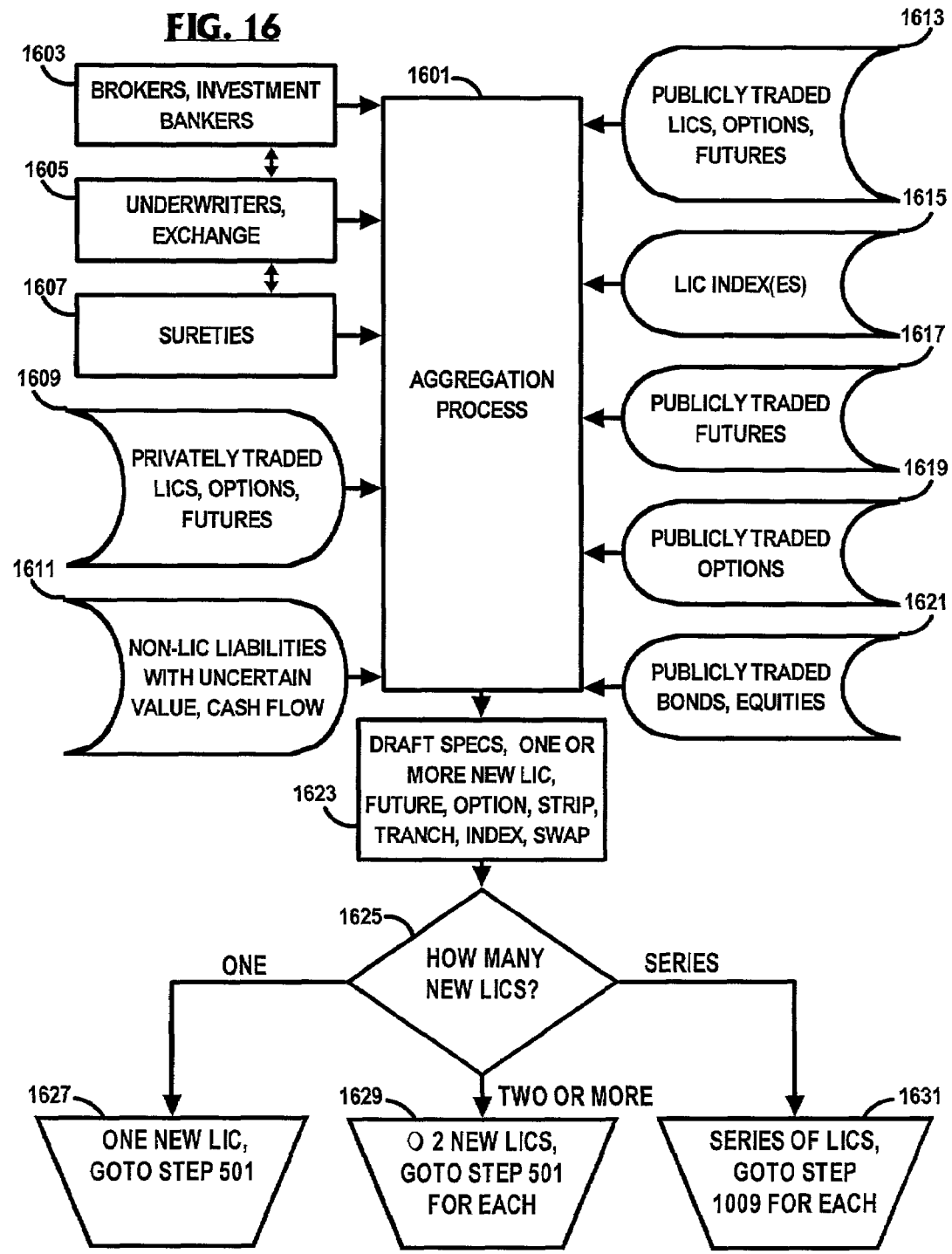

FIG. 17

EXCHANGE-TRADED SECURITIES
FLOATERS, INVERSE FLOATERS
FORWARD CONTRACTS
FUTURES
INDEX FUTURES
OVER THE COUNTER SECURITIES
SPREADS
STRIPS
SWAPS
TRANCHES, LAYERS
OPTIONS:
    AMERICAN OPTIONS
    ASIAN OPTIONS
    BARRIER OPTIONS
    BINARY OPTIONS
    CALL OPTIONS
    CHOOSER OPTIONS
    DETACHABLE OPTIONS
    EUROPEAN OPTIONS
    EXOTIC OPTIONS
    FORWARD START OPTIONS
    LOOKBACK OPTIONS
    OPTIONS ON OPTIONS
    PUT OPTIONS

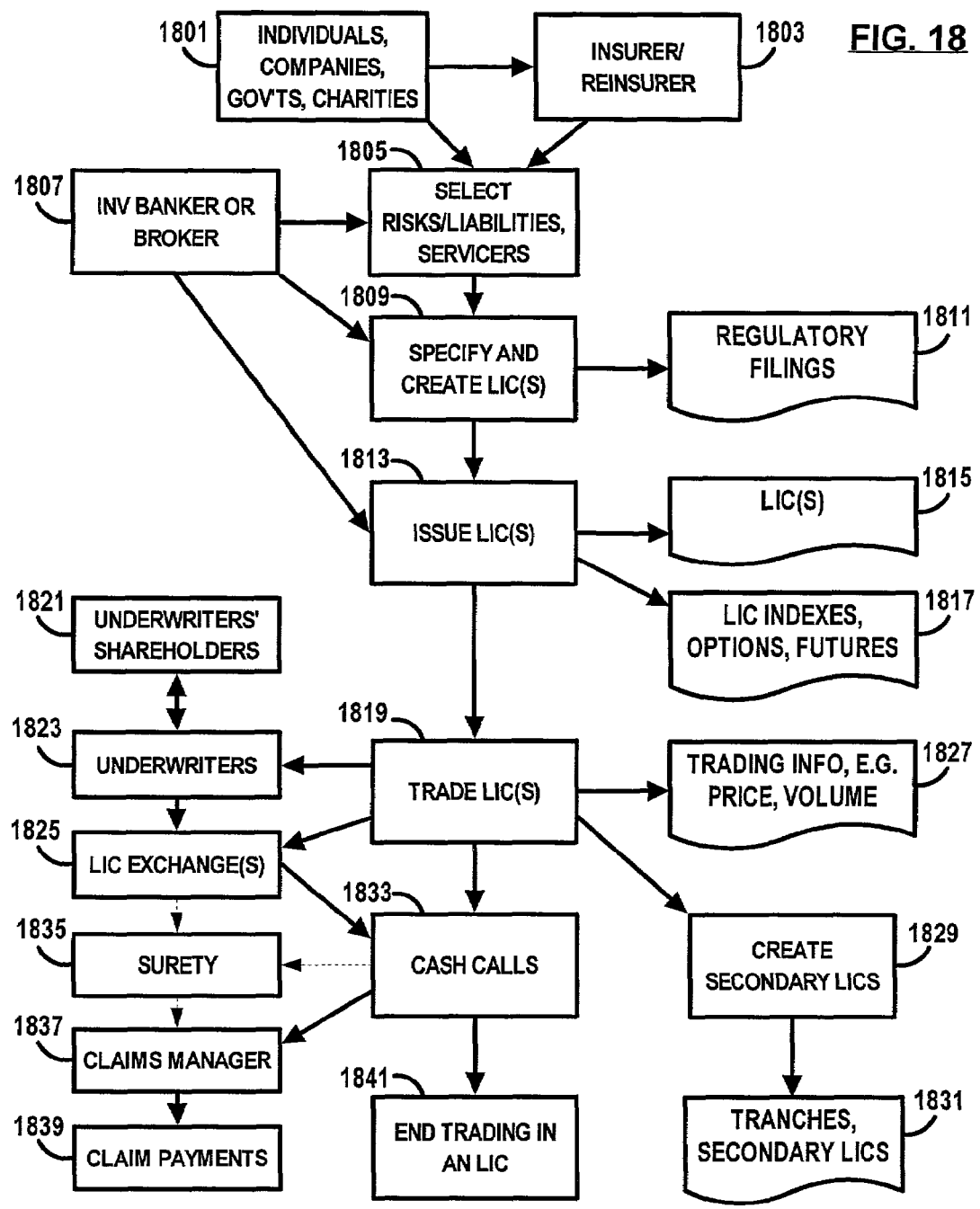

FIG. 19

| CONDITION(S) | SAMPLE ARBITRAGE TRANSACTION(S) |
|---|---|
| ISSUANCE OF LICS BY ORIGINAL RISKHOLDER | |
| 1901 COST OF ISSUING LICS < RETAINING RISK OR BUYING INSURANCE | ISSUE MORE LICS, BUY LESS INS. AND/OR RETAIN LESS RISK |
| 1903 COST OF ISSUING LICS > RETAINING RISK OR BUYING INSURANCE | ISSUE FEWER LICS, BUY MORE INS. AND/OR RETAIN MORE RISK |
| ISSUANCE OF LICS BY INSURER/REINSURER | |
| 1905 COST OF ISSUING LICS < RETAINING RISK OR BUYING REINSURANCE | ISSUE MORE LICS, BUY LESS REINS. AND/OR RETAIN LESS RISK |
| 1907 COST OF ISSUING LICS > RETAINING RISK OR BUYING REINSURANCE | ISSUE FEWER LICS, BUY MORE REINS. AND/OR RETAIN MORE RISK |
| ACTIVITY BY ISSUER AFTER LIC ISSUANCE | |
| 1909 MARKET PRICE OF LIC > RISK ADJUSTED PRICE OF UNDERLYING RISK | REPURCHASES LIC SHARES IN MARKET |
| | ISSUER EXERCISES REPURCHASE OPTIONS |
| 1911 MARKET PRICE OF LIC < RISK ADJUSTED PRICE OF UNDERLYING RISK | SELLS RETAINED OR REPURCHASED LICS SHARES |
| ARBITRAGE BETWEEN LIC ISSUES | |
| 1913 LIC A SHARE PRICE < LIC B SHARE PRICE, NEARLY IDENTICAL RISKS | CONVEY LIC A, ACCEPT LIC B |
| | CONVEY SHORT LIC A, ACCEPT LIC B |
| | SELL FUTURE ON LIC A, BUY FUTURE ON LIC B |
| 1915 LICS A, B, AND C IN A SERIES, B IS OVERPRICED | ACCEPT LIC B, CONVEY A & C |
| | CONVEY SHORT LIC B, ACCEPT LICS A & C |
| | SELL FUTURE ON LIC B, BUY FUTURE ON LICS A & C |
| | CALENDAR SPREAD USING OPTIONS |
| ARBITRAGE USING LICS, SECONDARY LICS, LIC FUTURES, OR LIC OPTIONS | |
| 1917 LIC A SHARE PRICE < FUTURES PRICE - PV EXPECTED CASH CALLS | SELL FUTURE, BUY LIC; SHORT FUTURE |
| 1919 PRICE LIC FLOATER + PRICE INVERSE FLOATER < PRICE ORIGINAL LIC | BUY FLOATERS, SELL LIC; SHORT LIC |
| 1921 TOTAL PRICE OF ALL TRANCHES < PRICE OF ORIGINAL LIC | BUY TRANCHES, SELL LIC; SHORT LIC |
| 1923 PRICE DETACHABLE CAT LIC + DETACHABLE BOND < PRICE CAT BOND | BUY DETACHABLE CAT LIC & DETACHABLE BOND, SELL CAT BOND |
| 1925 LIC A OPTION PRICE < LIC B OPTIONS PRICE, NEARLY IDENTICAL RISKS | BUY OPTION A, SELL OPTION B; USE OPTION A TO HEDGE LIC B RISK |
| UNDERWRITER AND LIC SHARES | |
| 1927 UND A NAV > UND A STOCK PRICE, ADJ FOR MGMT FEES | OTHER UND BUYS UND A SHARES INSTEAD OF UNDERLYING LICS |
| | OTHER UND BUYS UND A SHARES AND SHORTS LICS THEY DON'T WAN |
| 1929 UND A NAV < UND A STOCK PRICE, ADJ FOR MGMT FEES | OTHER UND BUYS LICS OWNED BY UND A INSTEAD OF UND A SHARES |
| ARBITRAGE BETWEEN UNDERWRITERS | |
| 1931 UND A SHARE PR/NAV < UND B SHARE PR/NAV, SAME MGMT FEES | BUY WHOLE UNDERWRITER A |
| | BUY UND A SHARES, SHORT UND B SHARES |

FIG. 20

| TERMS AND CONDITIONS OF A TYPICAL LIQUID INSURANCE CONTRACT ||
|---|---|
| OFFERING DATE | JULY 1, 2001 |
| CONTRACT TERM | JULY 1, 2001 TO DECEMBER 31, 2005 |
| BROKER | AON LIC SERVICES, INC. |
| LIC REGISTRATION # | ABC000001 |
| PRIMARY PARTY | ABC INSURANCE COMPANY. ABC IS RATED B++ BY BEST. |
| DESCRIPTION OF RISK | ALL AUTO INSURANCE POLICIES ISSUED BY ABC INS. CO. UNDER THE INSURANCE LAWS OF THE STATE OF TEXAS FROM JANUARY 1, 2001, TO DECEMBER 31, 2001. POLICIES EXPIRING FROM APRIL 1, 2001 TO DECEMBER 31, 2002. |
| SHARES OFFERED | 10 MILLION SHARES |
| OFFERING PRICE | $7.50 PER SHARE |
| COMMISSION TO BROKER | 4% ($3,000,000 IF ISSUE IS FULLY SUBSCRIBED) |
| LOSSES AND EXPENSES NOT SUBJECT TO THIS LIC | LOSS AND ALLOCATED EXPENSE PAID ON OR BEFORE JUNE 30, 2001, ARE NOT SUBJECT TO THIS LIC. |
| TRANCHES: IS THIS LIC PART OF A SET? | NO. |
| INITIAL ESCROW AMT. | $10 MILLION |
| ESCROW | CHASE BANK NA |
| CLAIMS CALLS | NOTIFICATION FIRST BUSINESS DAY OF EACH MONTH, DUE IN 30 DAYS. FIRST CALL NOTIFICATION AUGUST 1, 2001. LAST CALL NOTIFICATION JANUARY 2, 2006. |
| PREMIUMS RECEIVED AFTER ISSUANCE | NETTED AGAINST CASH CALLS |
| UNDERWRITERS' SURETY | CONTRACTUAL PERFORMANCE OF QUALIFYING UNDERWRITERS FOR THIS LIC IS GUARANTEED BY SWISS RE NORTH AMERICA LIC, INC. |
| UNSOLD SHARES | WILL BE RETAINED BY ABC |
| REINSURANCE APPLICABLE TO LIC'S | LOSS AND ALLOCATED LOSS ADJUSTMENT EXPENSE EXCESS OF $500,000 PER OCCURENCE REINSURED BY AIG. THERE IS NO OTHER APPLICABLE REINSURANCE. |
| CLAIMS SERVICE PROVIDER | PRIMARY: AON CLAIMS SERVICES, INC. BACKUP PROVIDER IN CASE OF PRIMARY PROVIDER NONCOMPLIANCE: HELMSMAN CLAIMS SERVICES, INC. |
| COMPENSATION FOR CLAIMS SERVICES | $4.75 MILLION SUBJECT TO PRO-RATION CLAUSE. CLAIMS SERVICES COVERED BY THIS LIC. |
| ADDITIONAL TERMS | STATE TAXES, ASSESSMENTS AND CHARGES, DUE DILIGENCE, OTHER INSURANCE, REPS AND WARRANTIES COVER ON LIC ISSUER. |
| WARRANTIES BY THE RISK TRANSFEROR | PREMIUM, EXPOSURE, UNDERWRITING RATING RULES AND PLANS SIMILAR TO RISKS IN PREVIOUS YEARS |

FIG. 21

LIC ISSUER ORGANIZED AS:
- C CORP
- CLOSED END FUND
- GENERAL PARTNERSHIP
- JOINT VENTURE
- LIMITED LIABILITY COMPANY
- LIMITED LIABILITY PARTNERSHIP
- OPERATING ENTITY
- S CORP
- SPECIAL PURPOSE VEHICLE
- FEDERAL AGENCY
- FEDERAL GOVERNMENT
- LOCAL GOVERNMENT
- MUTUAL FUND
- NATIONAL GOVERNMENTS
- PUBLIC AUTHORITY (E.G., PORT AUTHORITY)
- PUBLIC ENTITY
- PUBLIC LIMITED COMPANY (UNITED KINGDOM)
- QUASI-GOVERNMENTAL AGENCY (E.G, FANNIE MAE)
- STATE GOVERNMENT
- NOT FOR PROFIT
- BANKRUPTCY COURT AND/OR CREDITORS

FORM OF OBLIGATION:
- BOND
- CERTIFICATES OF PARTICIPATION
- DETACHABLE RISK COMPONENT
- INDEX
- LIQUID INSURANCE CONTRACT
- REINSURANCE, FACULTATIVE
- REINSURANCE, TREATY
- SPECIAL UNIT OF BENEFICIAL INTEREST (SUBI)

METHOD OF TRADING:
- EXCHANGE TRADED
- PRIVATELY TRADED
- OVER THE COUNTER
- SHARE CREATION AND REDEMPTION

NONINSURANCE RISKS
- ENERGY/UTILITY BILLS
- FUEL PRICES

INSURANCE COVERAGES/RISKS:
- ABORTED MERGER OR ACQUISITION BID
- AIRCRAFT
- AUTOMOBILE
- BOILER AND MACHINERY
- BURGLARY
- BUSINESS RISK
- CREDIT CARD THEFT/FRAUDULENT CHG
- COLLISION DAMAGE WAIVER
- COMMERCIAL PACKAGE
- COMMON CARRIER LIABILITY
- COMMODITY PRICE
- CREDIT, CREDIT LIFE
- DIRECTORS & OFFICERS
- DISABILITY
- EARTHQUAKE
- ECONOMIC INDEXES OR INDICATORS
- EMPLOYEE BENEFITS
- EMPLOYEE SEVERANCE COST
- EMPLOYEE STOCK OPTIONS
- ENERGY COST
- ERRORS & OMISSIONS
- FIDELITY
- FIRE
- FLOOD
- GAP (ON FINANCED ASSETS)
- HAIL
- HOMEOWNERS
- LIABILITY/GENERAL LIABILITY
- LIFE, TERM
- LIFE, WHOLE
- LOAN DEFAULT
- MARINE
- MEDICAL MALPRACTICE
- MORTGAGE GUARANTY
- POLITICAL RISK/SEIZURE/NATIONALIZATION
- POLLUTION
- POST RETIREMENT MEDICAL
- PRODUCT LIABILITY
- PROPERTY
- PUNITIVE DAMAGES
- RENTAL CAR COVERAGE
- REPRESENTATIONS & WARRANTIES
- RESIDUAL VALUE
- SPRINKLER
- SURETY/BOND GUARANTEE
- TAX OR ACCOUNTING OPINION
- TITLE
- TRANSIT COVERAGE
- VIATICAL
- WAR/NUCLEAR
- WARRANTY/EXTENDED WARRANTY
- WEATHER
- WORKERS' COMPENSATION
- ANY OTHER INSURABLE RISK

FIG. 22

UNDERWRITER ORGANIZED AS:
- C CORP
- CLOSED END FUND
- GENERAL PARTNERSHIP
- JOINT VENTURE
- LIMITED LIABILITY COMPANY
- LIMITED LIABILITY PARTNERSHIP
- OPERATING ENTITY
- S CORP
- SPECIAL PURPOSE VEHICLE
- FEDERAL AGENCY
- FEDERAL GOVERNMENT
- LOCAL GOVERNMENT
- MUTUAL FUND
- NATIONAL GOVERNMENTS
- PUBLIC AUTHORITY (E.G., PORT AUTHORITY)
- PUBLIC ENTITY
- PUBLIC LIMITED COMPANY (UNITED KINGDOM)
- QUASI-GOVERNMENTAL AGENCY (E.G, FANNIE MAE)
- STATE GOVERNMENT
- NOT FOR PROFIT

UNDERWRITER CREATED BY:
- INSURER
- REINSURER
- MUTUAL FUND MANAGER
- SPONSOR

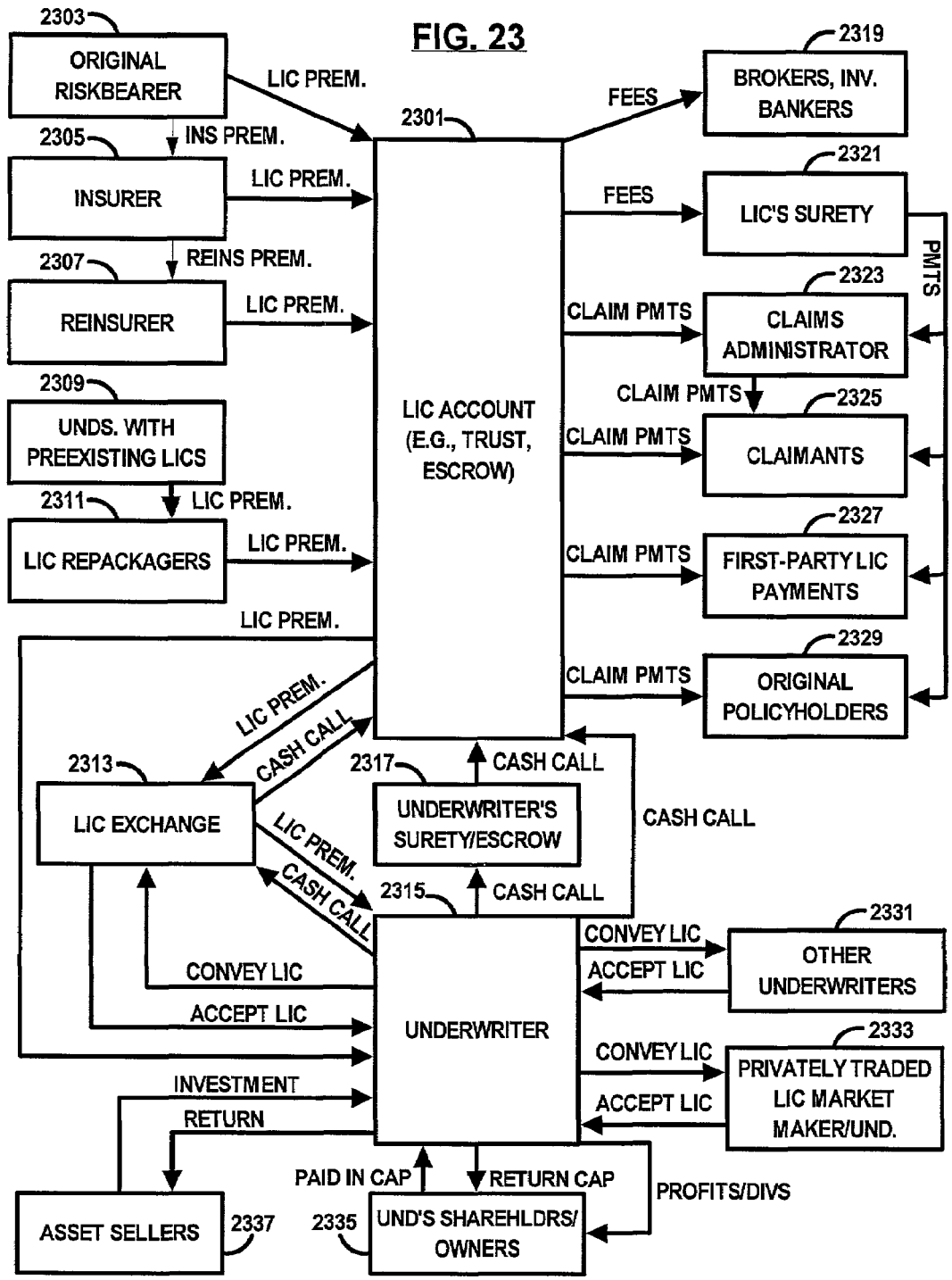

FIG. 24

| METHOD OF REMOVING LIC FROM TRADING | AFTERWARD LIC SHARES OWNED BY | FINAL PRICE FOR TRADE/SALE DETERMINED BY |
|---|---|---|
| 2401 SCHEDULED EXPIRATION | NO ONE | N/A |
| 2402 ISSUER CALL OPTION | ISSUER | LIC DOCUMENTS |
| 2403 UNDERWRITER PUT OPTION | ISSUER | LIC DOCUMENTS |
| 2404 MANDATORY REPLACEMENT WITH NEXT IN SERIES | ISSUER OWNS OLD, UND OWNS NEW | N/A |
| 2405 HOSTILE TAKEOVER | TAKEOVER FIRM (UND, INS CO) | MARKET PRICE |
| 2406 FRIENDLY TAKEOVER | TAKEOVER FIRM (UND, INS CO) | MARKET PRICE |
| 2407 ROLLED UP BY AGGREGATOR | AGGREGATOR | MARKET PRICE |
| 2408 PURCHASE IN OPEN MKT BY ISSUER OR SPONSOR | LIC ISSUER OR SPONSOR | MARKET PRICE |
| 2409 PURCHASE IN OPEN MKT BY SURETY | SURETY | MARKET PRICE |
| 2410 PURCHASE BY SURETY DUE TO DEFAULT | SURETY | MARKET PRICE |
| 2411 FORCED LIQUIDATION OF LIC ENTITY BY REGUL. | REGULATORS OR LIQUIDATORS | MARKET PRICE |
| 2412 BANKRUPTCY OF LIC ENTITY | CREDITORS | MARKET PRICE |
| 2413 MOVED TO DIFFERENT EXCHANGE | SAME UNDERWRITERS | MARKET PRICE |
| 2414 DELISTING DUE TO INACTIVE TRADING | SAME UNDERWRITERS | MARKET PRICE |
| 2415 DELISTING DUE TO NONCOMPLIANCE | SAME UNDERWRITERS | MARKET PRICE |
| 2416 DELISTING DUE TO GOING PRIVATE | UNDERWRITERS/MARKET MAKERS | MARKET PRICE |

LIQUID INSURANCE CONTRACTS

CROSS REFERENCE TO RELATED APPLICATION

The present invention claims priority from U.S. Application No. 60/238,798 filed Oct. 6, 2000 entitled "Liquid Insurance Contracts", which is incorporated herein by reference.

FIELD OF THE INVENTION

The present invention relates to a mechanisms and methods for creating and trading and otherwise managing financial risk.

BACKGROUND OF THE INVENTION

The need of individuals, businesses, government agencies and other entities to transfer risk from time to time is well known. Many financial instruments transfer financial risk, each in its own way. Insurance is a particular class of financial instruments in which risks are defined by contract and explicitly transferred from one party (the insured) to another (the insurer). Reinsurance is a particular class of financial instruments in which risks are defined by contract and explicitly transferred from an insurer to another party (the reinsurer). By general and common interpretation, these descriptions of insurers and reinsurers encompass all entities who undertake to assume risk with the expectation of gain or service, including without limit risk pools, associations, and guarantee funds, for example. In general, risk transfer contracts are entered into because the contract improves the financial position of both parties as each party balances risk and return.

The risks of loss of life, health, property, income and other value are generally, although not always, transferred to the capital markets by means of investments in insurers and reinsurers. The insurers and reinsurers aggregate the risks they underwrite. The risk-return profile of an insurer's portfolio of risks is different from the risk-return profile of any one of the risks. Insurers and reinsurers manage the risk and return of their portfolios of liabilities in the context of their portfolios of assets and the expectations of their investors. Investors, therefore, are interested in the portfolios of risks underwritten by the insurers and reinsurers in whom they invest. Because the insurers and reinsurers have portfolios of assets as well as portfolios of liabilities, the investors are interested in the combined asset and liability portfolio of insurers and reinsurers.

Current requirements for financial reporting do not, however, provide for complete and timely information about the portfolios of assets and liabilities held by insurers and reinsurers. Until the invention, investors are not able to invest in insurers or reinsurers about which they have complete information about the portfolios of assets and liabilities. As a result, until the invention, capital does not flow promptly to the insurers and reinsurers in response to changes in events. Also as a result, insurers and reinsurers must use simple signals to the capital markets, such as adding exclusions to insurance policies in the wake of events.

The risks of catastrophic loss of property have grown as homes and businesses have increasingly become concentrated and have increasingly been built on the major coastal areas of the United States and other countries. In the Pacific Rim, such coastal areas present the hazards of earthquake and tsunami as well as the hazards of windstorm and flooding. Although various responses have been developed in the 1990's, such as the California Earthquake Authority, the Florida Windstorm Association and the creation of new financial tools including Catastrophe Bonds, Contingent Surplus Notes, Exchange-Traded Catastrophe Options and Catastrophe Equity Puts, these are deemed to be incomplete solutions by their supporters as well as their critics.

Capital does not flow readily from capital markets to those insurers or reinsurers who have experienced unanticipated risk events that led to financial loss because it is difficult for the investor to know if a financial loss recorded by an insurer or reinsurer is due to the realization of insured contingencies or bad management. One of the principal functions of management is to manage underwriting leverage, which is the extent to which capital is committed or possibly over-committed to the underwriting of risks. The underwriting portfolios of insurers and reinsurers are not visible to investors today; all that is available is aggregate statistics such as the dollars of premium income realized from contracts underwritten in a period and the company's estimate of total future payments for each major class of insurance. There has been no direct way for an investor to distinguish a financial loss reasonably expected to arise from an event such as a windstorm, from a financial loss arising from an undesirable concentration of exposures in any one kind of risk such as residential property.

Evidence for the lack of capital flow is that markets for insurance contracts often do not clear. Prices do not change to reflect all changes in information. Sometimes consumers are unable to find policies at any price. Sometimes insurance companies are unable to find reinsurance policies at any price. The reason cited is that the insurance industry (or the reinsurance industry) does not have the financial capacity to underwrite the risks.

In addition to the problems arising from the lack of transparency of portfolios of assets and liabilities, problems arise because insurance contracts bundle suretyship, risk transfer and claim handling together in the context of product design and pricing. This itself is not a problem for the insured, but it creates a problem for the investor which wishes to participate in the risk transfer alone, in the following four ways and others.

First, entities desire to make more efficient use of their capital. More than 3,000 life, health and property-casualty insurance companies operate in the United States today. There is duplication of effort and inefficiency in this system. During the 1990's new companies were set up to deal with specific problems, in spite of the high cost of doing so, because it had been difficult for companies to demonstrate effectiveness in one service area, such as claim administration, with performance measures that reflect the consolidated effect of results in all three service areas (risk transfer, claim administration, and suretyship). In the 1990's, commissions for reinsurance policies have typically been from 3% to 20% of the premium paid for the policy; there are additional expenses for both the insurer and the reinsurer. Also, it has been difficult for reinsurance companies to allocate their underwriting capacity efficiently because no trading floor exists for the exchange of reinsurance contracts. Even conceptually such a floor cannot exist for today's reinsurance contracts because such contracts combine two services, suretyship and risk transfer. Suretyship is the assurance that the contract will be performed.

Second, new technologies create advantages for alert entities and their customers or stakeholders. Until the present invention, insurers and reinsurers have been slow to implement new technologies because of regulatory hurdles and the fact that insurance contracts combine risk transfer, suretyship, and claim administration, each of which is amenable to technology not suitable for the other. Although there are firms that manage claims and do not sell insurance, most insurance claims are managed by the insurance companies that sell the insurance. Investors have no way to distinguish the performance of a claims management organization that is embedded in an insurance company and reward good claim management with access to capital. Investors have no way to distinguish the performance of an underwriting unit (obtaining adequate price for risks underwritten) that is embedded in an insurance company, and to reward good underwriting with access to capital. Therefore it is difficult for either the claims function or the underwriting function to access the capital needed to finance the development of new technology.

Third, consumers and citizens demand increasingly diverse products and services from the businesses and agencies that serve them. Consumers, citizens and businesses demand increasingly broad coverage from their insurance companies. Until the invention, the insurance industry has typically taken several years to respond to new demands. One reason for the lack of timely response is that the insurance policy changes have required coordination of risk transfer, suretyship, and claim administration. There has been no process in place to deal with each of these areas on its own.

Fourth, although electronic auctions have become a part of the general economy, electronic auctions have not become a significant part of the risk-transfer process. One reason might be that the risk contracts being offered are not defined with sufficient precision or standardization.

In addition to the foregoing, several examples of traditional financial risk management programs are described below.

Exchange Traded Futures and Options—The vast majority of futures and options traded on organized exchanges are based on one of the following: stock price, bond price, metal price, energy price, agricultural commodity price, exchange rate, stock index value, or bond index value. In the vast majority of cases, the underlyer can be purchased in the open market. However, there are several exceptions on the current futures markets.

Catastrophe Futures—Property casualty catastrophe futures and options are traded on the Chicago Board of Trade. These are based on indexes of insured catastrophe losses occurring in the United States. Catastrophe futures are based on a liability index, rather than an actual liability of one or more individual insurance policies.

Index Futures—The Bankruptcy Index is now traded on the Chicago Mercantile Exchange. This contract is based on an index of the number of consumer bankruptcy filings. Bankruptcy Index futures and options are based on an index which correlates with a liability: bankruptcy and dollars of consumer credit bad debt.

Heating Degree Day contracts are also traded on the Chicago Mercantile Exchange for several cities. These contracts correlate with energy demand and energy prices. These have no underlying asset or liability.

Presently, there are no known exchange-traded futures based on baskets of insurance policies. See, Commodity Futures Trading Commission, "Futures and Options Contracts Designated by the Commodity Futures Trading Commission as of Sep. 30, 1998", http://www.cftc.gov/annualreport98/contractsdesig.htm.

Detachable Securities—Detachable securities have occurred in a variety of forms over the years. Fairly common versions of detachable securities include: put options on bonds, call options on bonds, convertible debt warrants, detachable stock warrants, and detachable bond coupons. To date, there is no known case of the detachable security being a listed security which is exchange traded, but not related to debt or equity of the issuer. For example, there are no known detachable securities for exchange-traded gold futures, wheat futures, or heating degree day options.

English Auction—The most common form of auction is an English auction, where all bidders gather at the same time in the same place to bid on one or more assets, and the auctioneer solicits progressively higher bids from the potential buyers until only one bidder is left. The winner claims the item, at the price he last bid.

Dutch Auctions—In a Dutch auction for a single item, bidders can see the current price of one asset and must decide if they wish to purchase at that price or wait until it drops. The winner is the first bidder at the current price. To date, versions of Dutch auctions have been used for auctioning multiple identical assets. One version of a Dutch auction is used for IPOs to allow all bidders to bid for a particular number of shares at a particular price. The sellers take the highest group of bids which will sell the number of shares in the IPO. All successful bidders get their shares at an identical price: the lowest successful bid. An example of this process was the WR Hambrecht and Co. underwriting for the Andover.Net IPO in 1999.

Other Index Futures and Options—The vast majority of futures and options traded on organized exchanges are based on one of the following: stock price, bond price, metal price, energy price, agricultural commodity price, exchange rate, stock index value, or bond index value. In the vast majority of cases, the underlyer can be purchased in the open market. However, there are several exceptions on the futures markets. Catastrophe futures and heating degree day futures were mentioned above.

The Bankruptcy Index is now traded on the Chicago Mercantile Exchange. This contract is based on an index of the number of consumer bankruptcy filings. Bankruptcy Index futures and options are based on an index which correlates with a liability: bankruptcy and dollars of consumer credit bad debt.

SUMMARY OF THE INVENTION

The present invention overcomes these deficiencies in existing systems of risk transfer between entities, insurers, reinsurers, and the capital markets. Firstly, the invention enables investors to know every asset and liability of each of the Underwriters in which they invest or might invest. Secondly, it enables investors to rapidly bid up the value of such underwriters when events favor them, and bid down the value of such underwriters when events are unfavorable to them. Thirdly, it enables investors to employ computational algorithms in computer workstations and hand-held devices to value the relative advantage or disadvantage of making a change in the holdings they have in individual Underwriters. Fourthly, it enables Underwriters to employ computational algorithms in computer workstations and hand-held devices to value the relative advantage or disadvantage of making a change in their portfolios of assets and liabilities in light of changes in the trading prices of Liquid Insurance Contracts and the trading prices of shares in Underwriters. Fifthly, it enables Underwriters to raise capital from investors by making changes in their portfolios transparent to the investors.

The invention can be used to create responses to events such as, but not limited to, hurricanes, floods, fires, earthquakes, terrorism and changes in law. In the case of terrorism, for example, the invention could be employed to create Liquid Insurance Contracts covering various kinds of loss from terrorism; these Liquid Insurance Contracts would be underwritten by the Underwriters; the risks thus underwritten would be transferred in turn to the world-wide capital markets through investors' ongoing investments in the Underwriters. In this way, entities would be spared the problems created by exclusions of loss arising from terrorism, and Congress would be spared the need to enact a special solution to each new risk-creating problem.

The invention applies the lessons of the capital markets to the structure of the risk-transfer process. In capital markets, capital can move quickly in response to events. The invention brings this quick movement of capital to the risk-transfer process. The capital markets use trading floors to reduce transaction costs. The invention brings this low-cost mechanism to the risk-transfer process. The capital markets use prices as proxies for the combined effects of expected payoff, uncertainty of payoff, and timing of payoff. As a direct result, in the capital markets, prices change in response to changes in information and trading floors nearly always clear. The invention brings these benefits to the risk-transfer process.

The invention gives to investors the information needed to determine if underwriting decisions are profitable. Thus it gives investors a way to measure the performance of the underwriting function and separate out financial loss due to the realization of insured contingencies from those that are due to bad management including excessive underwriting leverage.

The invention gives the investors the information investors need to determine if underwriting decisions are profitable because it separates the risk-transfer function from the claims management function. By subtraction, it provides performance management information regarding the claims management function. In this way the invention promotes operating efficiencies and facilitates investments in new and useful technologies for underwriting and for claims management.

The invention provides a means for capital to flow to support new types of coverage and coverage of new types of risks. Both by separating out the suretyship function (so that insurance regulators know that insurance contracts can be trusted) and by making portfolios transparent (so that investors can see their total exposure to one hazard across a range of Underwriters), the invention facilitates the rapid creation of new insurance solutions.

These and other features and advantages of the invention will become more apparent with a description of the preferred embodiments in reference to the associated drawings.

DESCRIPTION OF THE DRAWINGS

FIG. 16 is a flowchart showing creation of secondary LICs from primary LICs through aggregation of multiple LICs, or LICs and other securities such as futures, options, bonds or equities;

FIG. 17 shows a listing of various types of secondary securities using LICs;

FIG. 18 is a flowchart showing the life cycle of an LIC;

FIG. 19 shows methods of arbitrage of underwriter shares and LICs;

FIG. 20 is a sample LIC deal summary page;

FIG. 21 shows possible legal structures for an LIC entity, forms of obligation, and risks included in LICs;

FIG. 22 shows possible legal structures for an underwriter, methods of takeover/expiration;

FIG. 23 is a flowchart showing LIC cash flows;

FIG. 24 shows methods of removing LICs from public trading;

DETAILED DESCRIPTION OF THE PREFERRED EMBODIMENTS

In the following description, the topics outlined below will be keyed to the drawings indicated.

I. Overview Of An LIC System—FIG. 1

II. Preparation For An LIC Issued By The Company Originally Bearing The Risk(s)—FIG. 2

III. Bundling Of Insurance Or Reinsurance Policies For An LIC—FIG. 3

IV. Creation Of LICs Based On Indexes—FIG. 4

V. Creation Of LICs—FIG. 5

VI. LIC Initial Offerings—FIG. 6

VII. Auction Of Shares—FIG. 7

VIII. LICs With Detachable Provisions, LIC Options Or LIC Futures—FIG. 8

IX. Bond With Detachable LIC—FIG. 9

X. Creation Of Exchange Traded Futures And Options—FIG. 10

XI. Operation Of An LIC Exchange—FIG. 11

XII. Operation Of An LIC Underwriter—FIG. 12

XIII. Surety And Collateral Arrangements For LICs—FIG. 13

XIV. Calculation Of Surety Or Collateral Amounts For Exchange-Traded LIC Contracts—FIG. 14

XV. Creating One Or More Derivatives From A Single Existing LIC—FIG. 15

XVI. Creating One Or More Derivatives From Multiple Existing LICs—FIG. 16

XVII. Secondary Securities Using LICs—FIG. 17

XVIII. Lifecycle Of An LIC—FIG. 18

XIX. Arbitrage—FIG. 19

XX. Sample LIC Deal Summary Page—FIG. 20

XXI. Legal Structures—FIG. 21

XXII. Forms Of Organizations—FIG. 22

XXIII. LICs And Related Cash Flows—FIG. 23

XXIV. Method Of Removing LICs From Trading—FIG. 24

XXV. Establishing An Underwriter As A Closed End Fund—FIG. 25

An exemplary preferred embodiment of the present invention is adapted to create a Liquid Insurance Contract (LICs) and to create related futures, options, and insurance products.

I. Overview of an LIC System—FIG. 1

Figure 1:
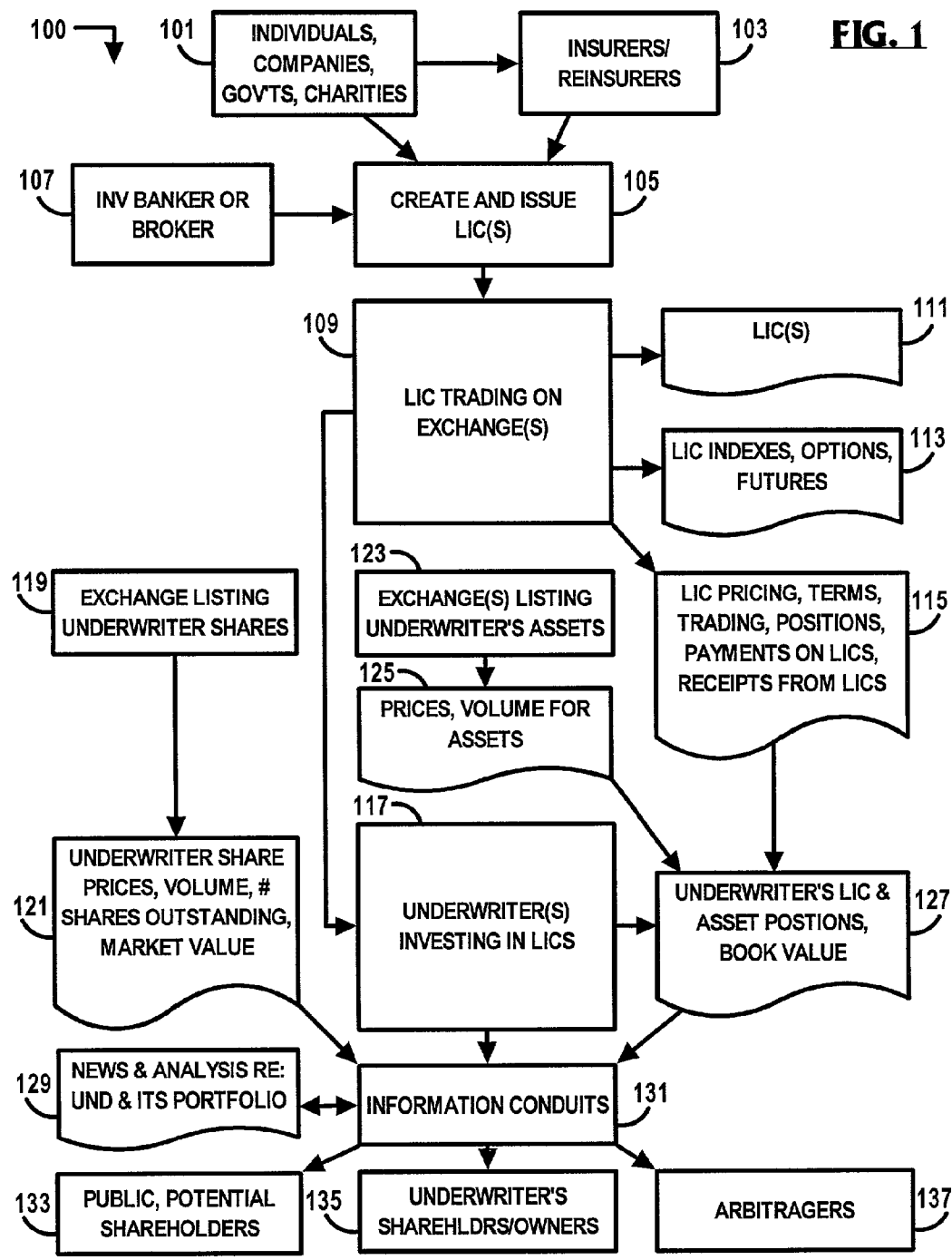
FIG. 1 is a high level, functional flowchart embodying an exemplary preferred system and method according to the present invention.

Referring to FIG. 1, an exemplary preferred system 100 according to the present invention is outlined. Risks or liabilities originate with individuals, companies, government entities, charities, or other sources 101. In the present invention, these risks or liabilities may be transferred to one or more insurers or reinsurers 103, or may be transferred by creating and issuing one or more Liquid Insurance Contracts (LICs) 105. One or more investment bankers or brokers 107 may facilitate the creation and issuance of LICs 105.

LICs 111 are traded on an exchange 109. The LIC exchange 109, may also trade related financial products such as LIC indexes, options, or futures 113. Non-LIC products might be traded on the same exchange. For example, the exchange might also trade, wheat, bonds, or equities. Information regarding trades is distributed, published, or otherwise made available by the LIC exchange 109. Such information may include LIC pricing, terms, trading, positions, payments on LICs, and receipts from LICs 115.

Underwriters investing or trading in LICs 117, trade LICs on one or more exchanges 109. Share in publicly held underwriters trade on one or more exchanges listing the underwriters' shares 119. Information regarding trades in underwriter shares is distributed, published, or otherwise made available by the exchange 119. Such information may include bid, asked, open and closing prices, share trading volume, the number of outstanding shares, and market value of the underwriter 121.

Many underwriters will also hold publicly traded assets, such as stocks, bonds, or commodity contracts. An exchange listing assets traded by an underwriter 123 distributes, publishes, or otherwise makes available information regarding prices and trading volumes of such assets 125.

An underwriter may have some assets or liabilities which are not publicly traded or marked to market. Current market prices and positions for LICs 115 and publicly traded assets 125 are combined with information from the underwriter itself 117, including assets or liabilities not marked to market, to show the underwriter's asset positions and book value 127.

News and analysis regarding the underwriter and its portfolio of LICs 129; bid, asked, open and closing prices, share trading volume, the number of outstanding shares, and market value of the underwriter 121; and the underwriter's LIC positions, asset positions and book value 127; are distributed, published, or otherwise made available through one or more information conduits 131. Such conduits might include newspapers, television, Bloomberg terminals, the internet, radio, or displays at the floor of the exchange(s). Such analysis 129 might include comparisons of underwriters 117 with one another or with statistical or summary information about underwriters 129, application of financial algorithms existing today in the art to information from the information conduits 131 or application of financial algorithms yet to be developed to such information. Data flows from the information conduits 131 to the general public and potential shareholders 133, the underwriter's current shareholders or owners 135, and arbitragers 137. Trading, analytic modeling, sensitivity testing, portfolio analysis and investment analysis methods are applied by brokers 107, underwriters 117, shareholders 135, potential shareholders 135, analysts and experts 129 and others to make pricing and underwriting recommendations and decisions.

II. Preparation for an LIC Issued by the Company Originally Bearing the Risk(s)—FIG. 2

Figure 2:
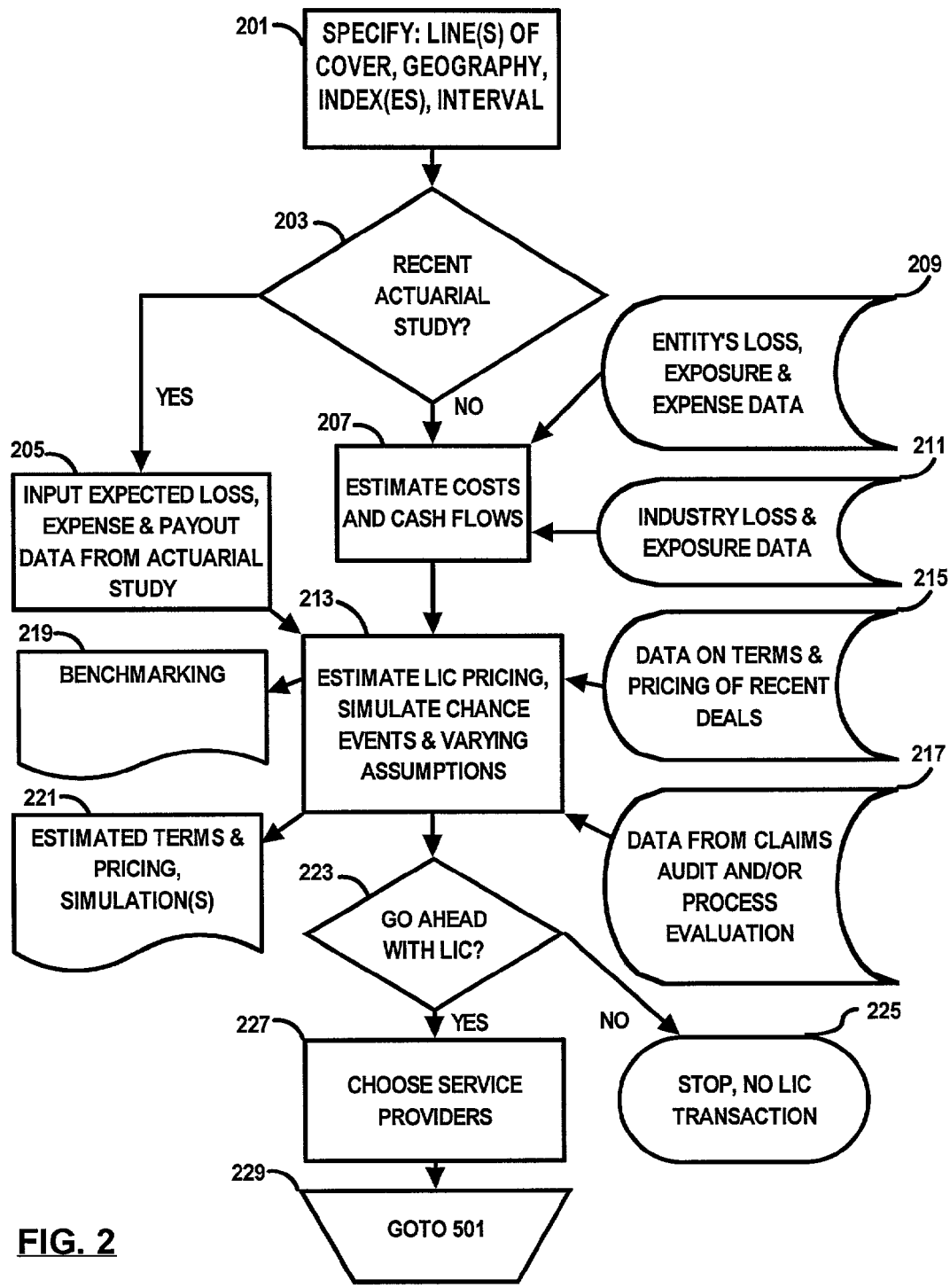
FIG. 2 is a flowchart showing preparation for an LIC issued by the company originally bearing risk(s) transferred using an LIC.

FIG. 2 is a flowchart showing creation of an LIC for the company originally bearing risk(s) transferred using an LIC. In this case, the risk has not been transferred to another party using insurance, futures, options, or other mechanisms. Examples of this type of risk might be: workers compensation claims for all Sears stores in the U.S. for calendar year 2002; pollution remediation costs for cleanup of a former refinery in Houston, Tex.; cost of all U.S. and European Union product liability claims associated with a new drug created by a pharmaceutical company; residual value losses at the end of closed end auto leases for an auto finance company; post-retirement medical expenses for General Motors employees; and extended warranty coverage sold on home electronics by Circuit City.

At step 201, the company specifies one or more lines of cover to include in a potential LIC. These coverages may be selected in a wide variety of possible ways. Coverages might be selected due to market pricing of LICs vs traditional insurance, dollar volume of expected losses in each coverage, which coverages have used LICs previously, or which coverages are difficult or impossible to obtain in the traditional insurance market.

At step 203 an actuarial study may be performed, or data from a recent actuarial study may be available. If an actuarial study is available, a "yes" advances to 205, where information from the actuarial study such as expected losses, expenses, and payout patterns are input. From 205 proceed to 213, where one or more estimates of LIC pricing are made. The estimation of LIC pricing also takes into account data on terms and pricing of recent deals 215, and data from a claims audit and/or an evaluation of claims processes 217. Data in 215 may be from either the company issuing LICs or from LIC deals on other risks; using recent LIC deals on comparable risks is an example of using LIC pricing from other risks to help set pricing for this LIC. Optionally, one or more simulations may be performed in step 213 to simulate chance events or varying assumptions. Examples of chance events might include: a catastrophic flood, an earthquake during working hours, many small nuisance claims, a sharp drop in gross national product, or using monte carlo simulation regarding the number and timing of claims. Varying assumptions might include: selling more or less of a product, changes in market interest rates, changes in exchange rates, or changes in the unemployment rate.

A "no" at step 203 advances to 207, where costs and cash flows are estimated without an actuarial study. For example, this might be appropriate in the case of a new kind of product, where actuarial analysis is of limited use. Step 207 may use the risk-bearing entity's loss or exposure data. There are a huge variety of possible forms of exposure data. Some possible forms of exposure data include: units sold, projected units sold, number of employees, revenue, payroll, square footage of office space, replacement cost of structures. Loss data includes any loss information relevant to the risk being transferred via the LIC. Such loss data might include: prior insured losses, prior uninsured losses, prior self-insured losses, or losses for related coverages. In many cases, industry loss or exposure data 211 and/or entity's loss, exposure and expense data 209 will also be used in step 207. Step 207 advances to step 213. The analysis in step 213 allows creation of benchmarking analysis 219. Such benchmarking might include comparison of expected or historical loss rates for the LIC issuer with comparable loss rates for other companies, issuers, or industry data. Estimated terms and pricing, and output from any optional simulation(s) are output in step 221. At step 223 a choice is made regarding whether to go ahead with an LIC. In many cases, the potential issuer will decide not to create an LIC. In that case, a "no" advances to 225 where the process stops, and no LIC transaction is completed. A "yes" at 223 advances to 227, where service providers for the LIC are chosen. Such service providers might include: claims administrators, safety, loss control, engineering, construction, banks, LIC underwriters, surety, trust companies, or escrow companies. In many cases, secondary or backup providers are also selected. In case of bankruptcy, poor performance, discontinuation of a particular service, or other causes, a service provider's replacement can be known in advance. This selection of backup providers may provide a greater level of comfort to potential LIC underwriters and result in lower pricing or easier sale of an LIC issue.

Figure 5:
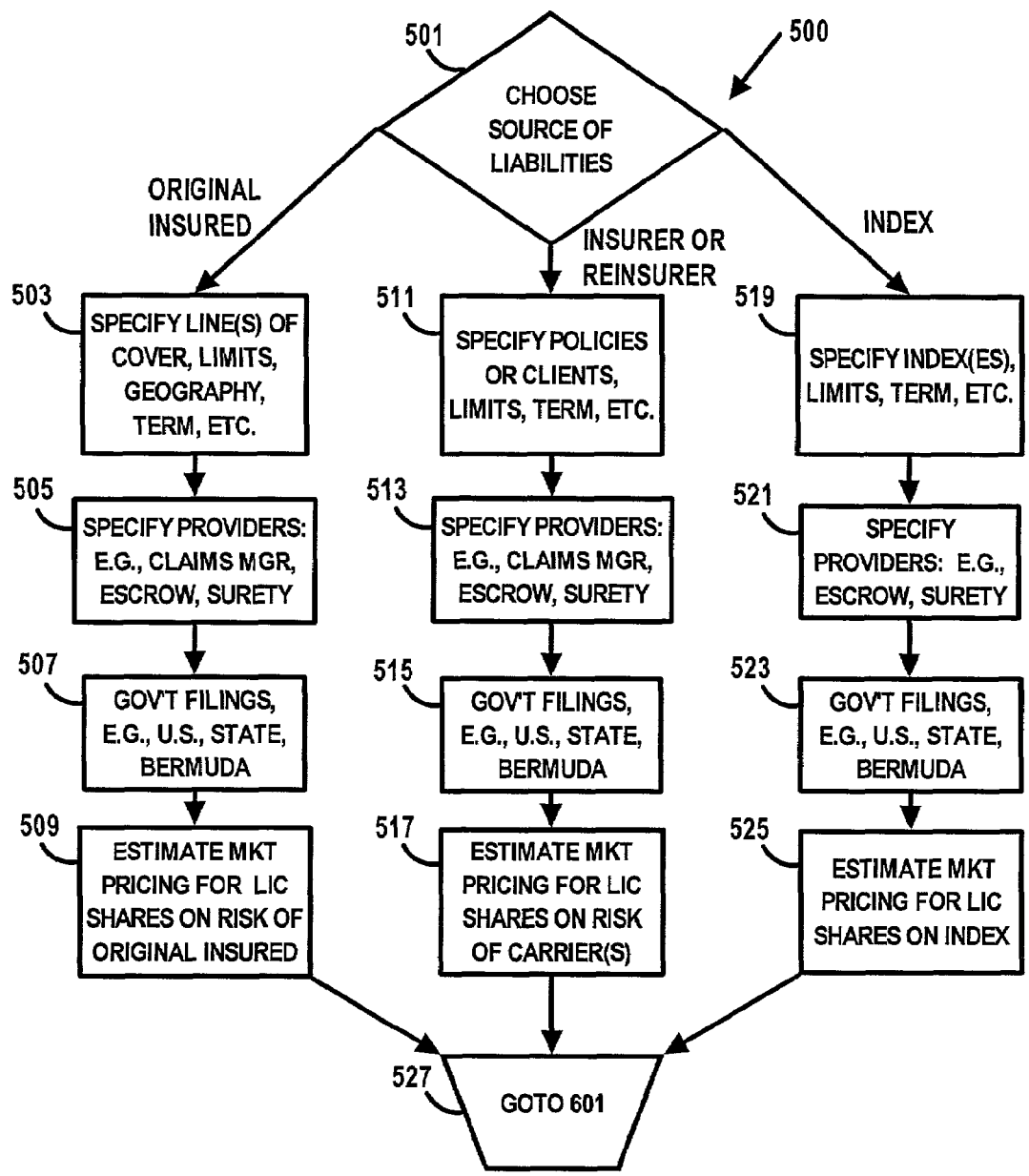
FIG. 5 is a flowchart showing creation of LICs.

At step 229, the process continues to step 501 of FIG. 5.

III. Bundling of Insurance or Reinsurance Policies for an LIC—FIG. 3

Figure 3:
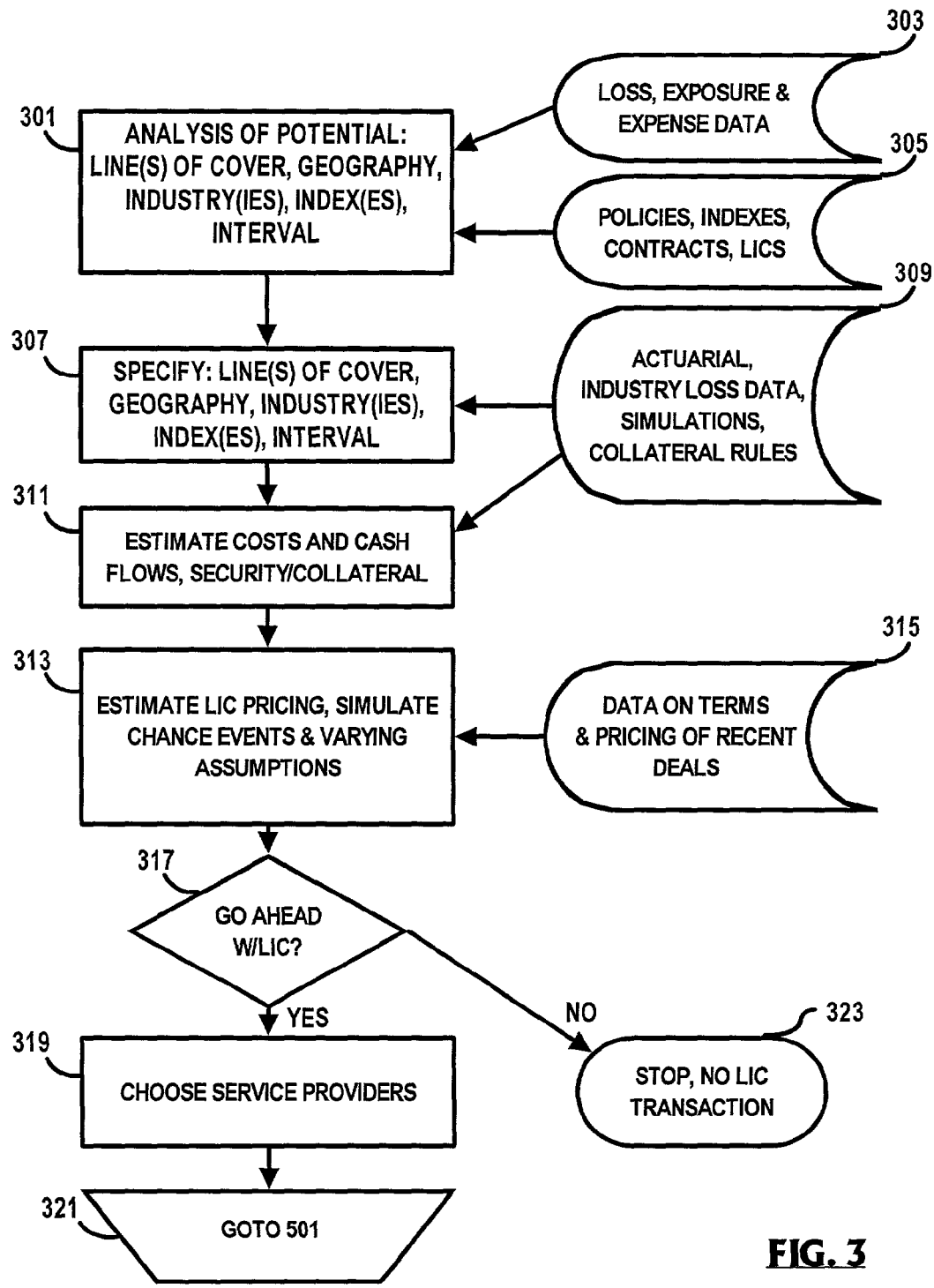
FIG. 3 is a flowchart showing bundling of insurance or reinsurance policies for an LIC.

FIG. 3 is a flowchart showing bundling of insurance or reinsurance policies for an LIC. An insurance or reinsurance company has an almost infinite variety of possible ways of creating one of more LICs from the policies it has written, or will write in the near future. At step 301, the insurer or reinsurer analyzes potential line(s) of cover (e.g., auto, workers compensation, directors and officers), geography (e.g., California, flood zone 2, nations where the Euro is the effective currency), industries (e.g., mining, aerospace), indexes (e.g., Chicago Board of Trade's Property Catastrophe Index, unemployment index, bankruptcy filing index, general liability cost of claims index, medical cost index), or interval (e.g., policies written in the first quarter of 2002, policies covering products manufactured during 2001). Step 301 uses input information on loss, exposure and expense data for candidate risks which might be included in an LIC 303. Information on insurance policies, indexes, contracts, and other LICs issued or held by the insurer or reinsurer 305 is also used in 301.

Using analysis from step 301, and actuarial analysis, industry loss data, and optional simulations 309, at 307 the insurer or reinsurer specifies: line(s) of cover, geography, industry or industries, index(es), and/or intervals which will define the scope of the LIC. After the scope is defined in 307, costs and cash flows are estimated in step 311. 311 also uses actuarial analysis, industry loss data, and optional simulations 309. At step 311, collateral or surety requirements are described, and may also be shown for various scenarios. For example, such scenarios might show surety or collateral requirements over the term of the LIC, for various loss scenarios, or at the LIC minimum or maximum.

Information from 311 is used, along with data on terms and pricing of recent deals 315 to estimate LIC pricing in step 313. Optionally, one or more simulations may be performed in step 313 to simulate chance events or varying assumptions.

From 313, advance to 317 where a choice is made regarding whether to go ahead with an LIC. In many cases, the potential issuer will decide not to create an LIC. In that case, a "no" advances to 323 where the process stops, and no LIC transaction is completed. A "yes" at 317 advances to 319, where service providers for the LIC are chosen. Such service providers might include: claims administrators, safety, loss control, engineering, construction, banks, LIC underwriters, surety, trust companies, and escrow companies. In many cases, secondary or backup providers are also selected. In case of bankruptcy, poor performance, discontinuation of a particular service, or other causes, a service provider's replacement can be known in advance. This selection of backup providers may provide a greater level of comfort to potential LIC underwriters and result in lower pricing or easier sale of an LIC issue.

From step 319 advance to step 321. At step 321, the process continues to step 501 of FIG. 5.

IV. Creation of LICs Based on Indexes—FIG. 4

Figure 4:
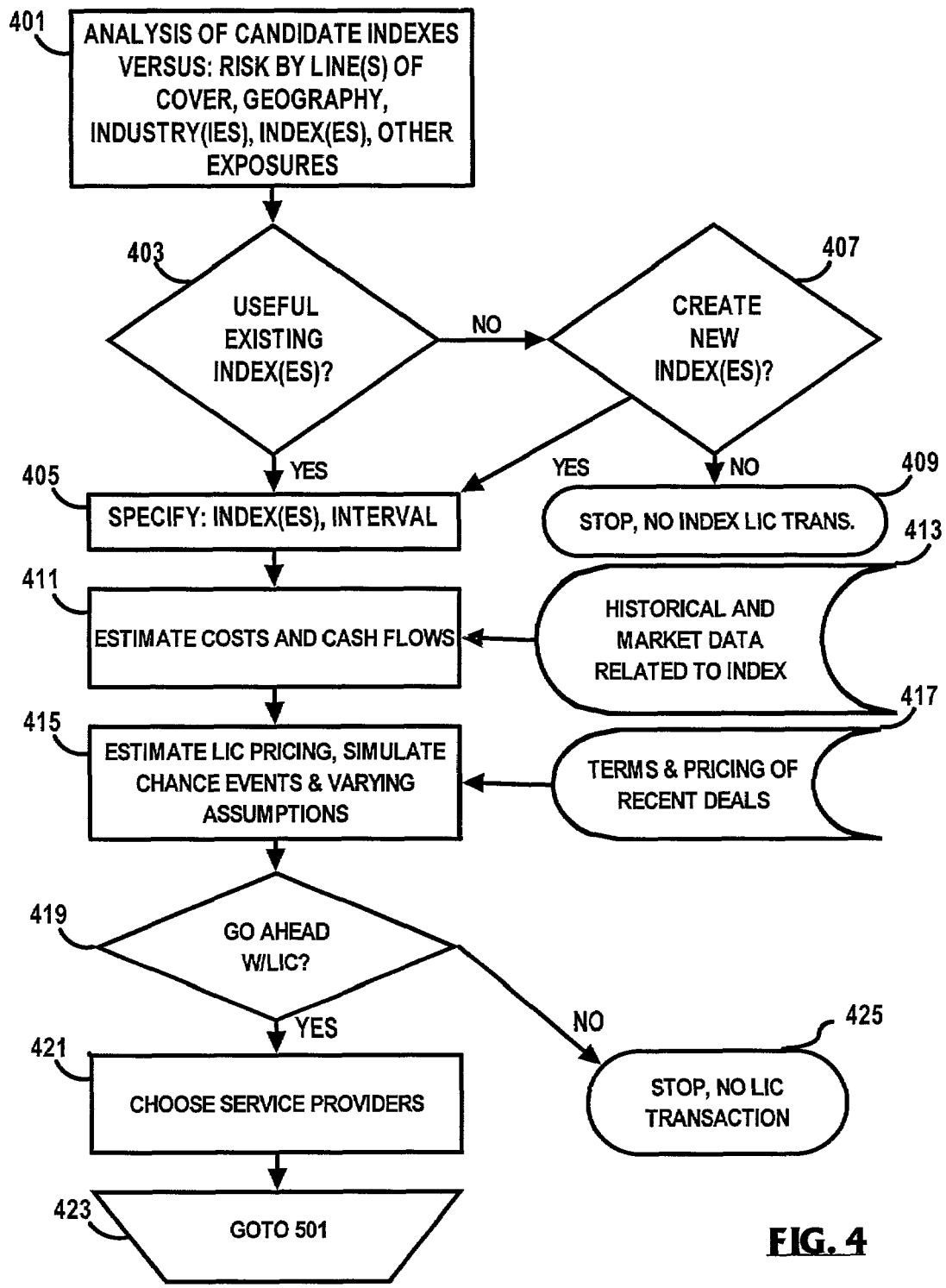
FIG. 4 is a flowchart showing specification of an LIC based on one or more indexes.

FIG. 4 is a flowchart showing the specification of an LIC based on one or more indexes. There are many preexisting indexes which are suitable for LICs. Using an index allows an LIC underwriter to assess risks and cash flows without regard to the issuer's book of business or exact service provider arrangements. The primary concern with using indexes for LICs is basis risk, the chance that the risk the issuer is trying to reduce or eliminate will not correlate well with the index (es). For many books of business, the index works well. In fact, selection of an index is usually done to match expected liabilities on the books. However, the process can also be run from the perspective of finding groups of liabilities which mirror a particular index. This might prove useful if LICs based on a particular index were liquid and favorably priced; the insurer could look for liabilities which match that index and "pair them off".

At step 401 analysis of candidate indexes and candidate risks is performed. The candidate indexes could be a single index or a combination of multiple indexes. Candidate indexes may be preexisting (e.g., Consumer Price Index, New Jersey No-Fault Auto Index, Hurricane Index), could be derived from preexisting indexes (e.g., Hurricane Index plus change in Consumer Price Index), or could be made completely from scratch by creating one or more new indexes. These indexes are compared to the companies liabilities, or expected liabilities, by various criteria. These criteria may include: risk by line of insurance coverage, geography, industry, risk from other indexes (e.g., the company has bought index futures or index LICs).

At step 403, a check is performed to see if any useful LIC can be created using one or more existing indexes. If "yes" proceed to step 405, where the index or indexes are specified, along with the time interval for which risks are expected to be transferred via an LIC. If "no" at 403 proceed to step 407, where a decision is made regarding whether to create one or more new indexes. In some cases, creating new indexes may not be practical, cost-effective, or useful. In any of those cases, no index LIC transaction is useful in this case and a "no" proceeds to step 409. If one or more new indexes are practical, cost-effective, and useful, a "yes" at 407 advances to step 405.

From 405, advance to 411, where costs and cash flows associated with the index are estimated. These estimates will likely be calculated in consideration of historical data regarding the index (e.g., history of cooling degree days, earthquake seismic records), or market data related to the index (e.g., Black-Scholes implied volatilities of an index future or option) from input 413. In some cases, both historical and market data are useful. In many cases, only one of the two types of data exists.

Information from 413 is used, along with data on terms and pricing of recent deals 417 to estimate LIC pricing in step 415. Optionally, one or more simulations may be performed in step 415 to simulate chance events or varying assumptions.

From 415 advance to 419. At step 419 a choice is made regarding whether to go ahead with an LIC. In many cases, the potential issuer will decide not to create an LIC. In that case, a "no" advances to 425 where the process stops, and no LIC transaction is completed. A "yes" at 419 advances to 421, where service providers for the LIC are chosen.

There are likely to be fewer service providers for index LICs, since the LIC is not based on actual losses or liabilities for that company. Service providers for index LICs might include: LIC underwriters, surety, trust companies, or an independent third party to calculate the value(s) of the index.

From step 421 advance to step 423. At step 423, the process continues to step 501 of FIG. 5.

V. Creation of LICs—FIG. 5

FIG. 5 is a flowchart 500 showing creation of LICs. Typically, most major decisions regarding the composition of the LICs and selection of service providers have occurred in FIG. 2, 3, or 4 and the process has continued to step 501 of FIG. 5.

At step 501, a choice of the source of liabilities is made. The process of creating LICs is slightly different for each. If the source of liabilities for the LIC is an "original insured", proceed from 501 to step 503. At 503, the liabilities included in the LIC are specified. These might include lines of cover, limits (e.g., percentage of expected losses), geography, or term. The LIC issue might be split in various ways, with different LICs in the same series having different specifications. For example, the limits might be layered, similar to tranching in FIG. 15. The terms of a series of LICs might be in a time sequence, similar to the sequences described in FIG. 10.

At step 505, providers are specified, such as claims manager, escrow provider, or surety. These have likely been chosen during the process in FIG. 2 and become part of regulatory documents, such as a prospectus, in step 505. Any changes or remaining choices are made at 505. In many cases, backup providers or mechanisms for replacing providers are specified in step 505. Since some LICs run for many years, it is prudent to prepare for the possibility that a provider might stop providing the service, go bankrupt, have significant deterioration in quality, might become out of compliance with contractual provisions, or otherwise need to be replaced.

At step 507, government filings are made. Which government filings are required may depend on various factors, including: the place of LIC issuance, location of LIC trading, location of original risk(s), whether the LICs are offered to the general public, domicile of the LIC entity, or whether the LICs are exchange-traded. The government filings might include: state filings, especially with state insurance regulators; U.S. filings, especially Federal securities regulators; foreign filings, with various governments where risks are located; or foreign filings with governments where LICs are issued or exchanged, such as Bermuda.

At step 509, market pricing for LIC shares is updated. This is similar to the process in step 211 of FIG. 2. However, market pricing may have changed during the regulatory and filing process. Thus, an update for current LIC market pricing is likely. After step 509 advance to 527, where the process branches to step 601 of FIG. 6.

If the source of liabilities for the LIC is an "insurer or reinsurer" proceed from 501 to step 511. At 511, the liabilities included in the LIC are specified. These might include lines of cover, limits (e.g., percentage of expected losses), geography, or term. The LIC issue might be split in various ways, with different LICs in the same series having different specifications. At step 513, providers are specified, such as claims manager, escrow provider, or surety. These have likely been chosen during the process in FIG. 3. Any changes or remaining choices are made at 513.

At step 515, government filings are made. At step 517, market pricing for LIC shares is updated. This is similar to the process in step 313 of FIG. 3. After step 517 advance to 527, where the process branches to step 601 of FIG. 6.

If the source of liabilities for the LIC is an "index" proceed from 501 to step 519. At 519, the index(es), limits and terms of the LIC are specified. The LIC issue might be split in various ways, with different LICs in the same series having different specifications. At step 521, providers are specified, escrow provider, or surety. These have likely been chosen during the process in FIG. 4. Any changes or remaining choices are made at 523.

At step 523, government filings are made. At step 525, market pricing for LIC shares is updated. This is similar to the process in step 415 of FIG. 4. After step 517 advance to 527, where the process branches to step 601 of FIG. 6.

VI. LIC Initial Offerings—FIG. 6

Figure 6:
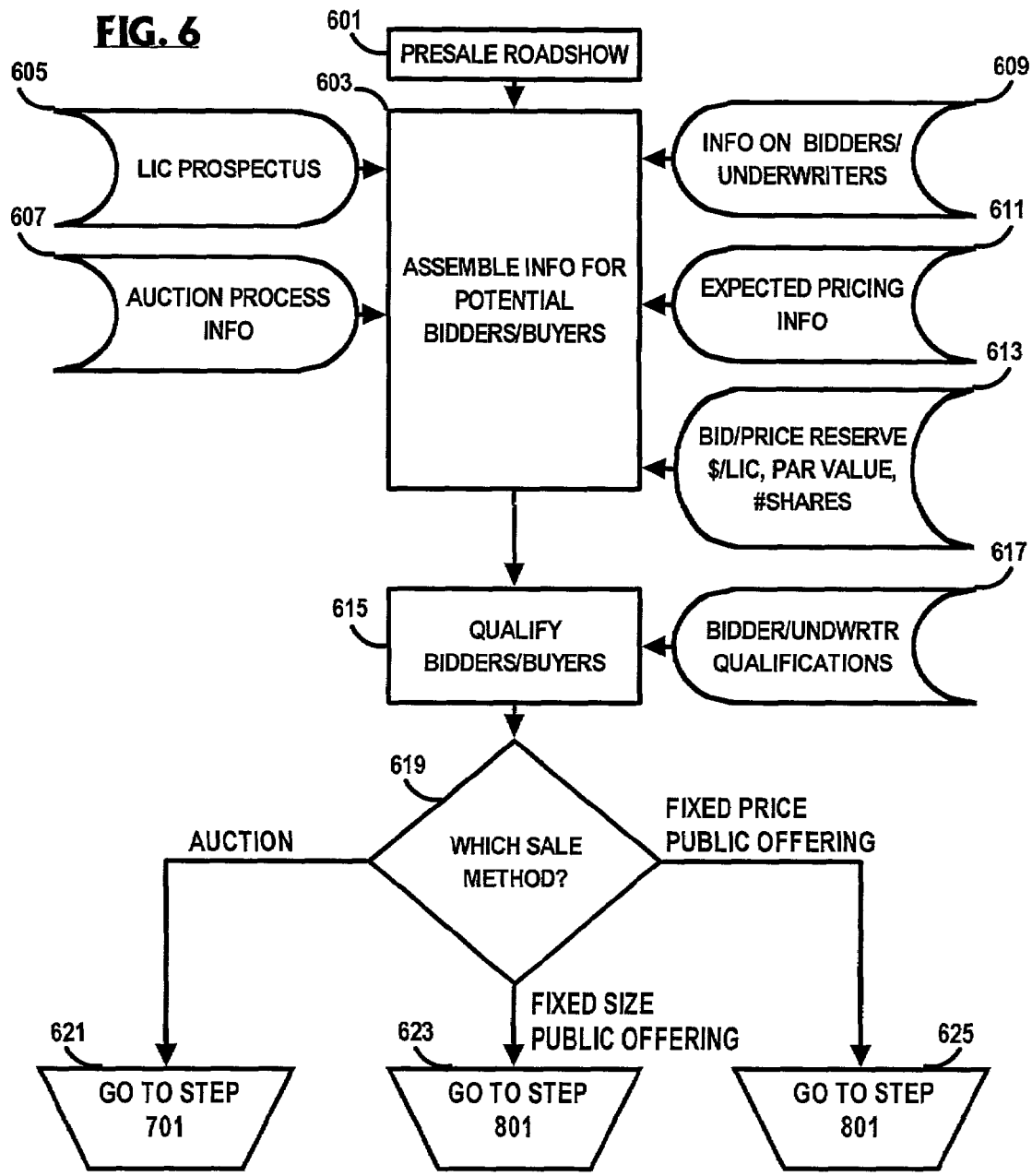
FIG. 6 is a flowchart showing presales activity for an LIC offering.
Figure 7:
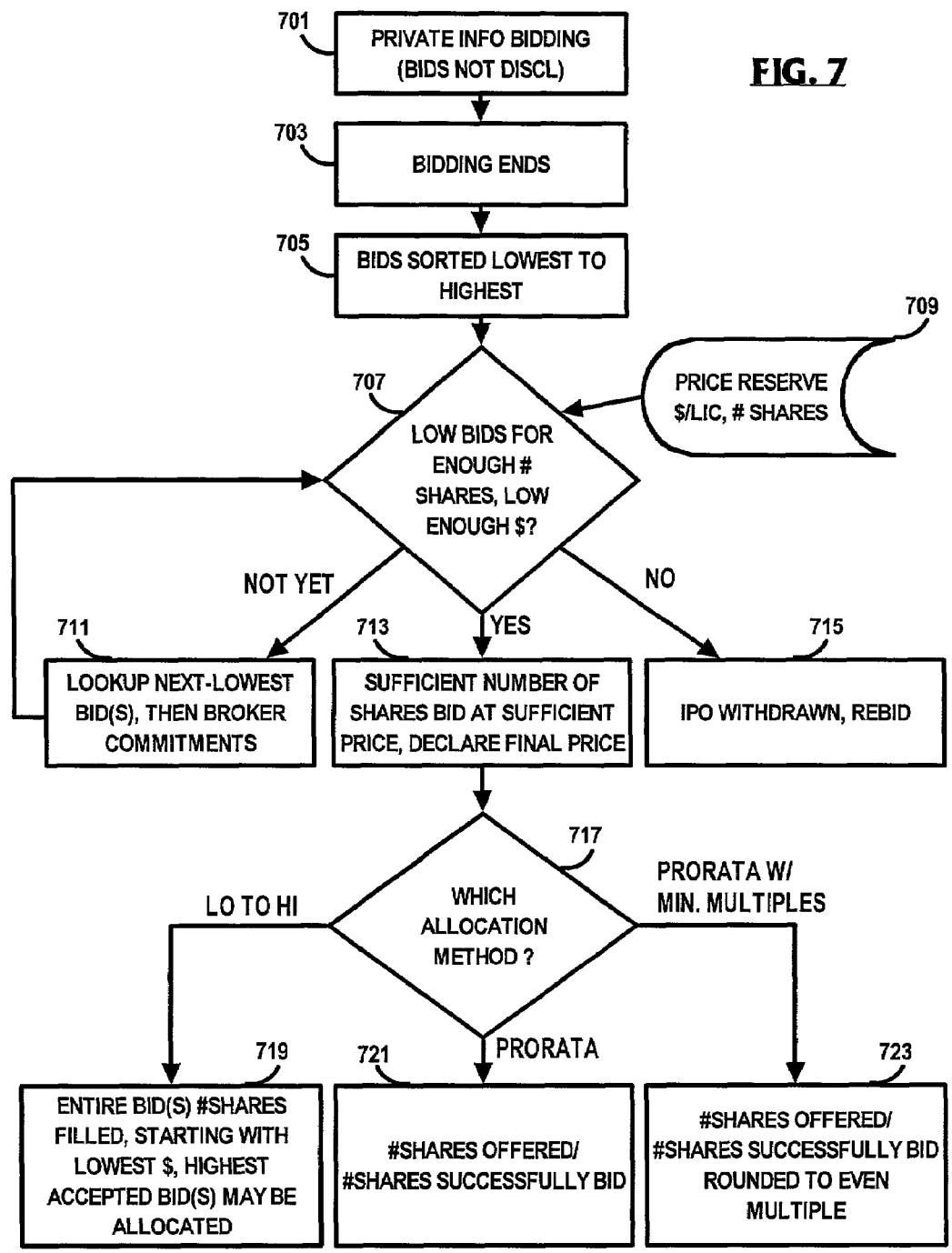
FIG. 7 is a flowchart showing detail of the Dutch auction process for LICs.
Figure 8:
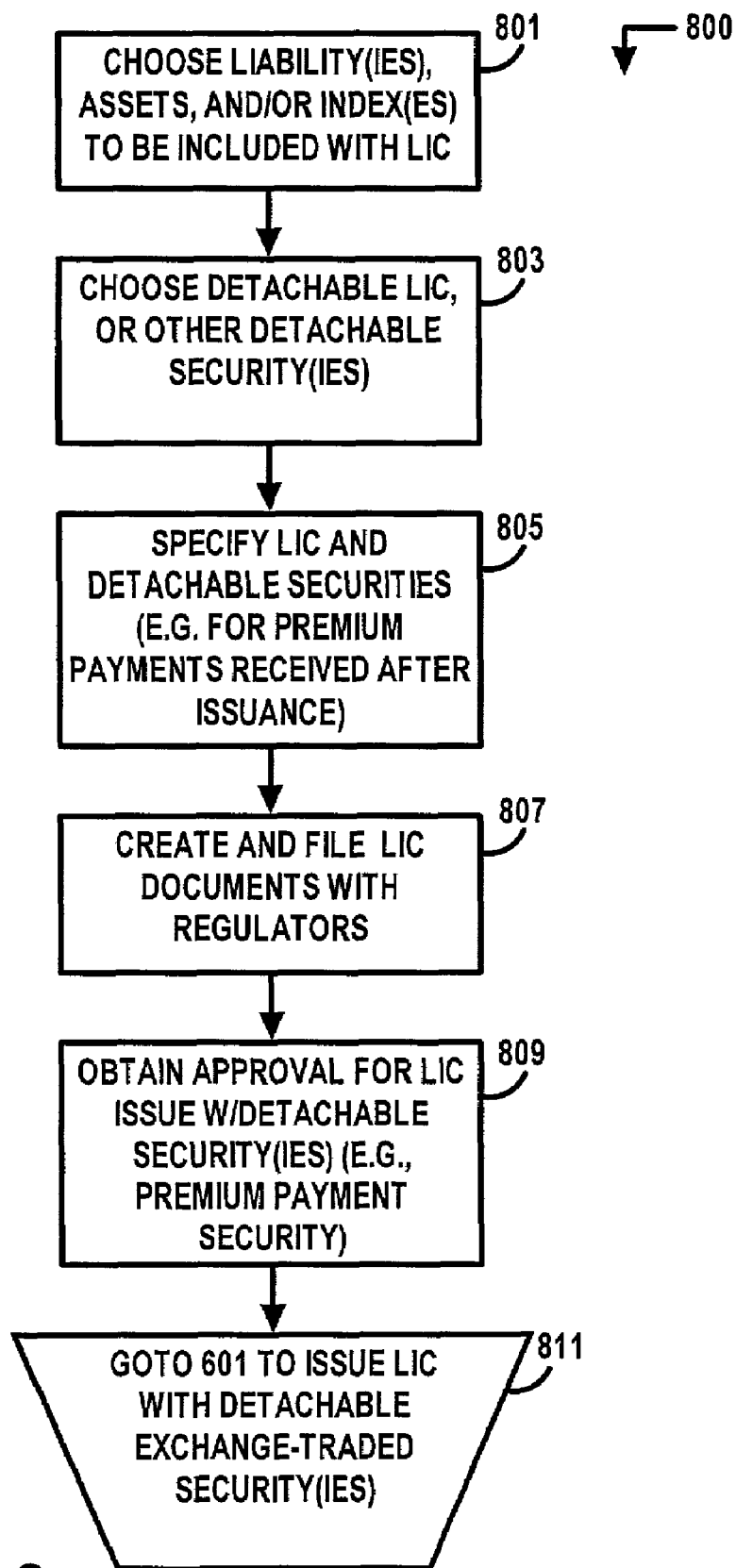
FIG. 8 is a flowchart showing an LIC with a detachable cash flow of premium payments occurring after the LIC issuance.

FIGS. 6-8 illustrate various aspects of the LIC offering process. LIC securities can be sold through a variety of mechanisms, including many mechanisms similar to those used for corporate stocks, bonds, U.S. Treasury securities, futures, and options. However, initial offerings for LICs have some substantial differences from other securities, such as stock IPOs or bond issues.

FIG. 6 describes the presale and buyer/underwriter qualification process. Step 601 is the presale roadshow, a series of presentations to potential investors and underwriters, usual over a period of several weeks before the offering. At step 603, information from many sources is gathered. Information gathered at 603 includes: the LIC prospectus 605; auction process information 607, such as start and close date for auction, method(s) of submitting bid(s), and method of allocating shares to winning bidders; information on potential buyers/underwriters 609; expected pricing information gathered from the roadshow and other sources 611; and bid or price reserves from the LIC issuer, the number of LIC shares offered, minimum or maximum number of LIC shares to be sold, acceptable prices per share, or par value 613. Setting a par value where initial expected premium per share equals a round number such as 10, 100 or 1000 would be similar to setting par value for a bond issue. Setting a par value where expected losses are 10, 100 or 1000 per share would allow traders to more conveniently compare current prices with opening prices and/or the expected change in pricing as LIC liabilities are paid out. Setting a par value at a fixed number which is a percentage of the maximum possible payout under the LIC provides an estimate of potential remaining liabilities.

At step 615 information on potential bidders/underwriters and qualifications for bidders/underwriters 617 may be used to determine which potential underwriters are qualified. Qualifications might include: ability to bear the risks of the LIC; membership on a particular financial exchange; proper domicile of the underwriter; sufficient ratings for the underwriter from S&P, Moody's or other rating agencies; sufficient ratings for the underwriter's surety company; ability to take a particular minimum quantity of LIC shares; or qualifications imposed by a regulator.

Qualified bidders/underwriters will be allowed to participate in the IPO sales process. At step 619, the method of sale determines the next step. For an "auction", step 621 directs the process to step 701 of FIG. 7. For a "fixed size public offering", step 623 directs the process to step 801 of FIG. 8. For a "fixed price public offering", step 625 directs the process to step 801 of FIG. 8.

VII. Auction of Shares—FIG. 7

There is an assortment of methods of auctioning LIC shares in an initial offering. Many such auction processes are familiar to those skilled in auctioning assets, and require a change from auctioning assets to the highest bidder to auctioning liabilities to the lowest bidder.

Dutch auctions have gained popularity recently for equity IPOs. While a similar process can work for an LIC IPO, the process requires some adaptation for the special characteristics of LICs.

FIG. 7 describes in detail a Dutch auction process for an LIC IPO. At step 701 bidding with private information occurs. Dutch auctions for IPO equity shares in companies going public have typically taken several weeks. For LIC IPOs bidders/potential underwriters' bids are not disclosed during the bidding. Bidding takes place over a time span, anywhere from a few minutes to a period of months. Typically, the ending time for the auction is declared before bidding begins.

There are a variety of potential ways of submitting bids. In many cases, multiple methods can run simultaneously. Potential bidding methods include: in person, via voice over the phone, via fax, in writing by mail, over the internet, and over a proprietary computer system.

Bidding ends at step 703. Then, at step 705 bids are sorted by amount offered per LIC share, from lowest to highest or highest to lowest. At step 707, the number of shares requested for all bids at the lowest price are totaled. Input 709 provides information used in step 707 such as: the price reserve per share (maximum bid per LIC share which is acceptable), number of shares offered, minimum number of shares to be sold, maximum number of shares to be sold, and any broker or investment banker commitments. In some cases, the broker(s) or investment banker(s) may have agreed to a firm commitment to assure all shares were sold, agreed to a standby commitment for remaining shares unsold at the end of the auction, or have made a minimax commitment to assure that some minimum number of shares were sold. Typically, the information in input 709 was previously determined in the presale process in FIG. 6.

To illustrate the process in steps 707-715, assume that 1,000,000 LIC shares were specified as being offered in input 709. Three bidders have requested LIC shares for which they wish to receive $21 each. $21 is the lowest bid by anyone. The first of the 3 bidders bid $21 for 5,000 shares, the second bid $21 for 85,000 shares, and the third bid $21 for 100,000 shares. The 190,000 shares is not enough to match the number of shares for sale, and "not yet" causes the process to go to step 711 to look up the next lowest bid(s) and return to step 707. If there are no more bids from the auction at any price, any broker or investment banker commitments are reviewed as if they had been bid during the auction process.

Assume there are bids for another 250,000 shares at $22 each, for a total of 560,000 shares bid at $22 or less. Since there are still not yet bids for 1,000,000 shares, the process repeats for the next lowest bids. Assume there are bids for 700,000 shares at $23 each. Finally, over 1,000,000 shares have been bid (190,000+250,000+700,000=1,140,000 shares); the number of bids is high enough to be fully subscribed and a "yes" advances the process from step 707 to step 713. At 713, a check is performed to see if the highest accepted bid is below the LIC issuer's reserve. Assume the issuer's reserve of $30 per share was specified in input 709. Then the bids are low enough to be accepted and "yes" advances to 713. If there were not bids for enough shares at or below the issuer's reserve, a "no" advances from 707 to 715.

At step 715, various choices are available. The entire IPO may be withdrawn and not offered again. In that case, no bidder gets any shares in the LIC IPO. The IPO might also be rebid. Rebidding might be more likely if a significant external event or change occurred during or shortly after the bidding process. For example, many ongoing auctions were virtually void of bidders when the Gulf War between the U.S. and Iraq began; most potential bidders were somewhere else watching CNN. Similar auctions the following month had normal numbers of bidders and bids. As another example, most long-term contracts have prices sensitive to interest rates. Thus, a significant change in interest rates shortly after the conclusion of an unsuccessful IPO might make rebidding desirable.

If there were a sufficient number of bids at sufficient prices, a single final price is declared at step 713. In a Dutch auction, all successful LIC bidders will receive the amount per share of the highest accepted bid to assume the LIC liability. Note that this is opposite condition to a Dutch auction of an equity IPO, where all successful bidders pay the amount per share of the lowest accepted bid to receive the equity asset.

In the current example, all LIC bidders who bid $23 or less per share will receive $23 per share to assume the LIC liabilities, regardless of their original bid. Any bidder who wanted to be virtually certain of obtaining LIC shares could have bid a very low amount for shares, even zero or a negative number. Even that bidder would receive $23 per share. Of course, a bidder bidding zero might be unlucky enough to find many other bidders had bid very low, and all of them obtained LIC shares at a price very unfavorable to the bidders.

Note that in some circumstances negative bids for an LIC will make sense. For example, an LIC contains liabilities for auto insurance bundled with stock in an auto body shop company. If the bidder believes the stock in the auto body shop company is worth more than the liabilities for auto insurance, the rational LIC price could be negative. Another example of a rational negative price would occur where an insurance company wishes to get rid of volatile liabilities and some bond investments in the same LIC. If the bidders believe the bonds are worth more than the liabilities, the LIC price can be negative. More generally, a negative LIC price means that the market has valued the assets, options, or rights granted by and LIC higher than the liabilities or obligations of that LIC.

In most cases, the number of shares bid at or below the winning price will not be exactly the number offered for sale. Therefore, a method is required to allocate the number of shares offered among the winning bidders. Information on the allocation method is from input 607 of FIG. 6 and would be provided to prospective bidders before the auction begins. An assortment of allocation methods can be envisioned; three methods are described in steps 719-723. Step 717 advances to the appropriate allocation process, depending on which allocation method was selected for this auction.

"Lo to Hi" advances to step 719. In 719, entire bids are filled from the lowest bid to the highest. In the example above, bidders who bid $21 or $22 per share receive their entire requested number of shares. Those bidding $23 do not have their entire request for number of shares filled. Instead the last 700,000 shares are allocated among those bidding $23 each; each receives (560,000/700,000) multiplied by (# of shares requested by those bidding $23 per share). More generally the rules for step 719 are:

A. Fill all bids completely for the lowest bidder(s) first, proceeding to highest bidder(s).
B. For the highest accepted bid(s), those bidder(s) each receive a number of shares equal to:

(remaining # shares in offering/total # shares bid at highest accepted price) multiplied by (# shares bid by that bidder at the highest accepted price).

In the example above these numbers are:

(560,000/700,000) multiplied by (# of shares requested by those bidding $23 per share), or an allocation of 80% of the number of shares requested by bidders making the highest accepted bids.
C. The remaining # shares in offering equals:

(total # shares in LIC offering to be sold to all successful bidders) minus (# shares successfully bid at prices lower than the highest accepted price).

In the example above these numbers are:
total # shares in LIC offering to be sold to all successful bidders=1,000,000;
shares successfully bid at prices lower than the highest accepted price=190,000 plus 250,000=440,000; and
remaining # shares in offering=1,000,000 minus 440,000=560,000.

If the allocation is "prorata", advance from 717 to step 721. In a prorata allocation, all bidders who bid at or below the highest accepted bid are treated equally. Each receives a number of shares equal to:

(total # shares in offering) divided by (total # shares bid at any accepted price) multiplied by # shares bid by that bidder at any accepted price In the example above, these numbers are:

(1,000,000 divided by 1,140,000) multiplied by # shares bid by that bidder at any accepted price, or an allocation of 87.72% of the number of shares bid by that bidder at any accepted price.

If the allocation is "prorata with minimum multiples", advance from 717 to step 723. In a prorata with minimum multiple allocation, all bidders who bid at or below the highest accepted bid are treated equally and bids are filled with even multiples of share numbers. For example, said even multiple might be multiples of 100, 1000, 10,000, 100,000 or 1 million shares.

In prorata with minimum multiples, each bidder receives a number of shares equal to the following, rounded to the nearest even multiple, rounded down to an even multiple, or rounded up to an even multiple:

(total # shares in offering) divided by (total # shares bid at any accepted price) multiplied by # shares bid by that bidder at any accepted price.

In the example above, if the multiple is 1,000 and fractions are rounded to the nearest thousand shares these numbers are:

1,000,000 divided by 1,140,000 multiplied by # shares bid by that bidder at any accepted price, or an allocation of 87.72% of the number of shares bid by that bidder at any accepted price. This share amount is rounded to the nearest thousand. The bidder who requested 5,000 shares would receive 4,386.97 shares; rounded to the nearest thousand this is 4,000 shares.

In some cases, the method in step 723 leads to a calculation which slightly oversubscribes or undersubscribes the offering. In such a case, the allocation percentage can be increased or decreases slightly to yield the exact number of shares, slightly more or fewer shares than expected can be issued, or a particular bidder can receive slightly fewer or more shares in some prespecified way.

Most other auction methods can be used for LICs as well. Practicality, market demands and regulations may have an effect on which auction types are used. For example, regulators may insist that all shares be at the same price during the initial offering.

An English auction normally takes the highest bid for an asset, and bids are known to all bidders. In the case of LICs, an English auction would take the lowest bid. A sealed bid first or second price auction would similarly be adapted to take the lowest or second lowest bid for LIC shares.

VIII. LICs With Detachable Provisions, LIC Options or LIC Futures—FIG. 8

Bonds have previously had an assortment of embedded options and a few types of detachable options. A typical detachable option is a warrant on the stock of the same company which issued the bond. In many cases, the warrants are separately filed with the U.S. Securities and Exchange Commission ("SEC"), have their own Committee on Uniform Security Identification Procedures ("CUSIP") number, and are traded on organized exchanges. Bonds which are convertible to the issuing company's stock have also been issued for years. On rare occasions, put or call options on the bond itself are detachable and tradable. To date, there have been no instances of detachable risk options issued with bonds.

Figure 9:
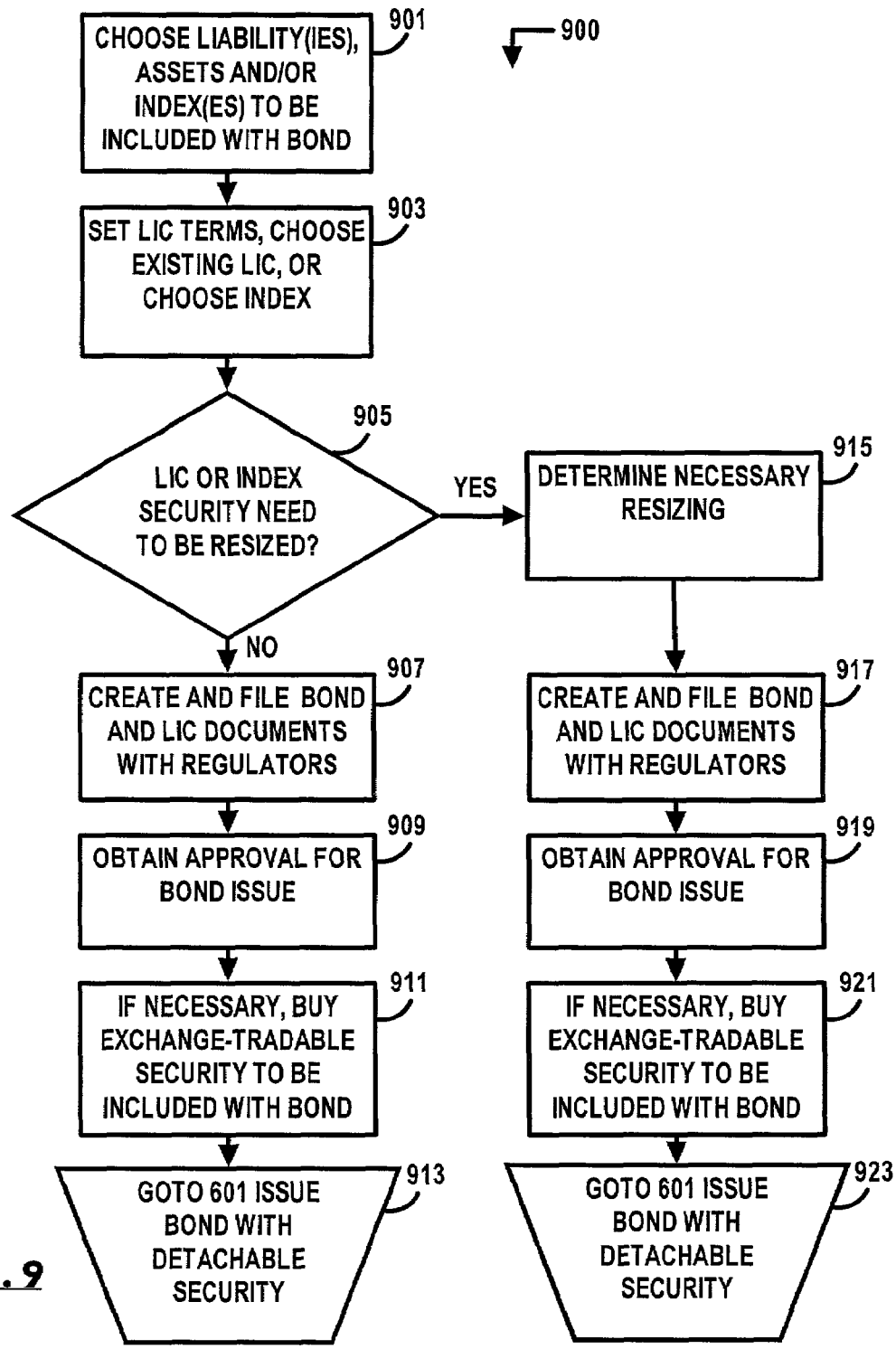
FIG. 9 is a flowchart showing a bond with a detachable LIC.

Since exchange-traded LICs, LIC futures, and LIC options presently do not exist, to date there have been no instances of LIC securities issued with detachable options, futures, derivatives or LICs. According to the present invention, two exemplary methods are displayed for creating such securities. An exemplary method for creating an LIC with a detachable security(ies) is illustrated in FIG. 8. An exemplary method for issuing a catastrophe bond using detachable security provisions, 900, according to the present invention is illustrated in FIG. 9. Other methods of creating LICs with detachable securities are also contemplated. Methods similar to those used in to create new LICs from existing LICs in FIGS. 15 and 16 can also be used to at initial issuance to create original issue LICs with detachable securities.

FIG. 8 is a flowchart 800 showing an LIC with a detachable cash flow of premium payments occurring after the LIC issuance.

In step 801, the issuer determines which liabilities, assets, and/or indexes to include with the LIC. In step 803, one or more detachable exchange-tradable securities are selected from the bundle of assets, liabilities and/or indexes determined in step 801. The detachable security(ies) can be anything which is exchange-tradable, such as: assets, for example, treasury bills, mortgage backed securities, or insurance premium payments received after issuance of the LICs; liabilities, including various tranches and strips of liabilities; or indexes, such as the Consumer Price Index.

At step 805 the LIC and its detachable provisions or components are specified. For example, many LICs will involve policies whose premium is not paid in full by the time of LIC issuance. The premiums received after issuance can be a detachable part of the LIC. Thus, underwriters who would prefer to obtain more cash early on could detach and sell the detachable premium security. Note that the detachable security does not need to have the same maturity, duration, or expiration as the LIC. In the case of a detachable premium security, the premiums might be received within 12 months of issuance, while the liabilities from the matching insurance policies would take many years to pay in full.

At step 807 the LIC issuer creates and files documents with regulators. These documents include necessary detail and filings for detachable securities to be traded. After regulatory approval is obtain in step 809, the process proceeds in a similar manner to sale of other LICs; the process advances to the presale roadshow at step 601 of FIG. 6.

IX. Bond With Detachable LIC—FIG. 9

FIG. 9 is a flowchart 900 showing a bond with a detachable LIC.

In step 901, the issuer determines which liabilities, assets and/or indexes to include with the bond. The bond could look very much like a typical corporate bond, but with LIC, LIC future, LIC option, LIC index, or catastrophe provisions attached. In step 903, one or more exchange-tradable LICs, LIC futures, LIC options, LIC indexes or catastrophe securities which are expected to be a good hedge for risks the issuer wishes to hedge are selected.

Since most exchange-traded futures, options, and indexes have large notional values (often in the hundreds of thousands), there may be a mismatch between the expected face value of the smallest increment of bond which the company would sell and the smallest increment of the hedge security. For example, the company might want to issue bonds in a minimum size of $1000 dollars, and multiples thereof. The desirable exchange-traded security might, for example, be an option with a minimum contract size that translates to a notional value of $200,000 on a particular date. If there is a mismatch, the finance company has at least two alternatives: increase the minimum size of the bond purchase so that one unit of the exchange-traded security is an appropriate hedge, or use the smaller bond sizes and create a new security which is a fractional share of the exchange-traded security. This decision is made in step 905. If the exchange-tradable security does not need to be resized, the company creates necessary filings for bond documents in step 907 (similar to current corporate or catastrophe bond filings).

After regulatory approval for the bond issue in step 909, the company proceeds in a manner similar to other lease bond or LIC issuances; however, prior to the bond issuance, the issuing company buys the exchange-traded securities in step 911. The process proceeds in a similar manner to sale of other LICs; at step 913 the process advances to the presale roadshow at to issue the bond and detachable security at step 601 of FIG. 6.

If it was determined that the exchange-tradable security needed to be resized in step 905, a new nonexchange-traded security can be created. The exact fraction of the exchange-traded security to match with the smallest unit of bond face value is determined in step 915. For example, it might be the case that a $1000 face value is the desirable minimum. The appropriate hedge for this bond value might be 2% of the minimum contract for the exchange-traded security. Thus, the issuer would need to create new securities which correspond to 2% of an exchange-traded security. These new securities could be issued by the special purpose vehicle issuing the bonds, or a separate trust, for example. The new securities are backed by the exchange-traded securities from which they are derived, similar to a mutual fund purchasing large blocks of securities and selling small shares in the mutual fund which are backed by the original securities. Separate regulatory filings are created for the bond and the new hedge security in step 917.

After approval for both the bond and detachable security(ies) are obtained in step 919, the issuing company purchases the exchange-tradable security which will back the detachable security in step 921. The process proceeds in a similar manner to sale of other LICs; at step 923 the process advances to the presale roadshow at to issue the bond and detachable security at step 601 of FIG. 6.

Each bond issue has the appropriate amount of risk hedge in the detachable nonexchange-traded security. The hedge security can be sold back to the trust or special purpose vehicle at a price based on market price of the underlying exchange-traded security. If a sufficient number of the non-exchange securities are redeemed, whole exchange-traded securities can be sold back into the open market.

Similar methods can also be used to create LICs which are bundles of multiple tradable LICs. One example of bundled LICs is an LIC sold at IPO containing multiple tranches for layers of losses. If each of the component tranch LICs has its own required filings (such as a CUSIP number in the U.S.), the components can be traded starting on the date of the IPO, often with lower frictional costs than creating new LICs from existing ones.

X. Creation of Exchange Traded Futures and Options—FIG. 10

Figure 10:
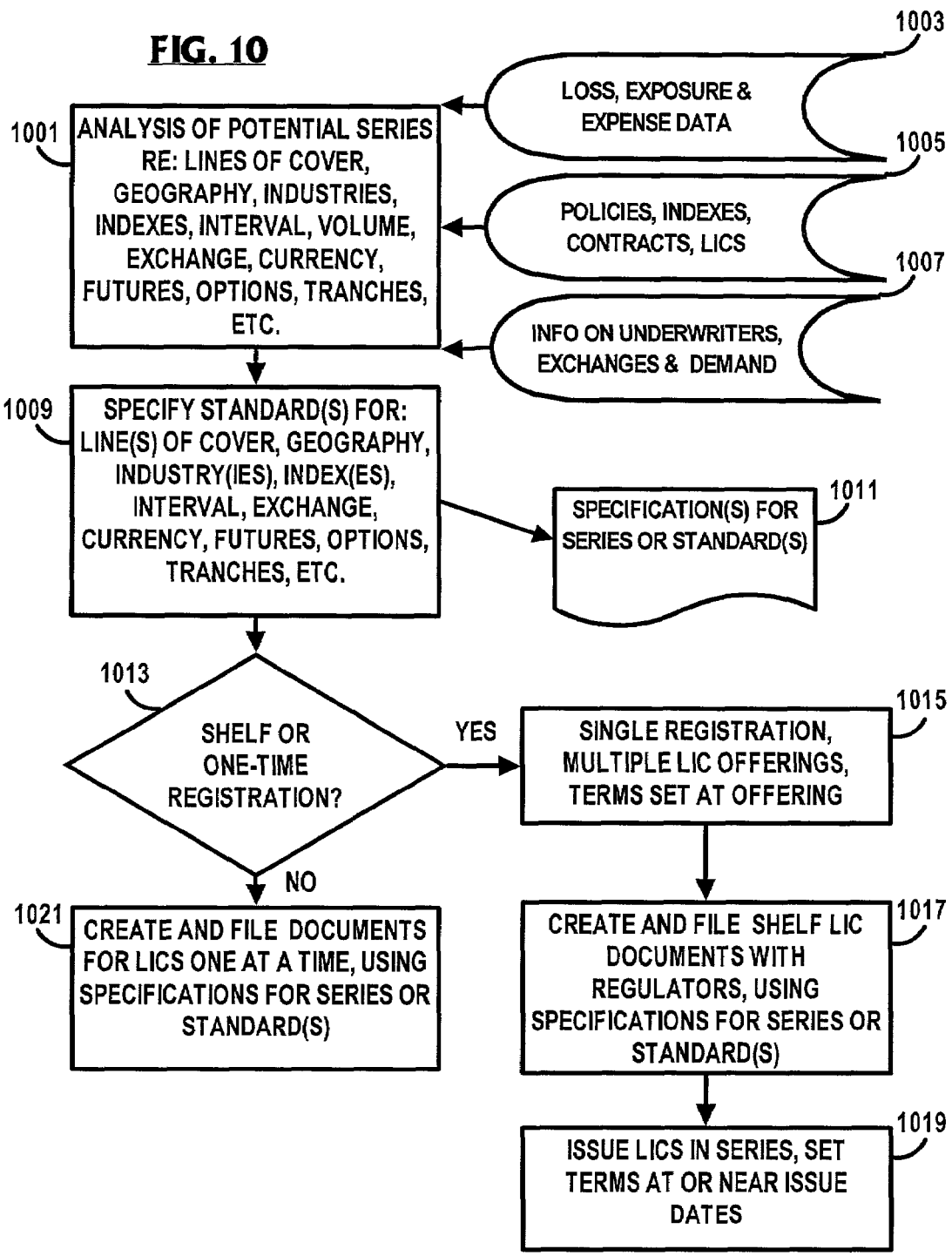
FIG. 10 is a flowchart showing creation of a series of related LICs.

FIG. 10 is a flowchart showing creation of a series of related LICs. Such LICs might be related by time, lines of coverage, geography, client industry, or indexes. A similar method also works for serial LICs, LICs with the same issue date and different maturities.

In some cases, standard products can be created, even though they are from different issuers. For example, a standard package of homeowners policies might contain: a particular average home value; a particular geographic distribution; a particular flood, fire, hail, or hurricane risk profile; and a particular distribution of construction types. A standard package of life insurance policies might contain: a particular age distribution; a particular percentage of smokers; a particular geographic distribution; and a particular distribution of policy limits.

In these cases, multiple LICs from different issuers could be so similar that they are very close substitutes for each other. Small basis risk would allow various hedging and arbitrage strategies. It would also make each of the securities more liquid and more accurately priced.

Two analogies to an LIC series are exchange traded futures and options. Exchange traded futures and options are filed with regulators and the basic structure of the contract is left intact. However, new futures and options with different expiration dates are regularly initiated on the exchange. For options, new exercise prices are typically initiated without new regulatory filings.

The biggest issuer of similar securities at different points in time is the U.S. Treasury. The provisions of Treasury bills, notes and bonds remain the same for years at a time and are well recognized. This similarity allows issues with small trading volume to still be effectively priced and traded. Numerous hedging and arbitrage strategies work because of the similarity and regular timing of the issues.

LIC product standards might evolve, or might be set by issuers, an industry group, an exchange or underwriters. Nearly identical issues have numerous efficiencies arising from regulation and investment banking. One example of such efficiencies is the shelf registration described in FIG. 10.

At step 1001 a party such as a potential issuer, exchange, underwriter, or industry group analyzes factors such as: potential lines of cover, geography, industries, indexes, currency of the LICs, futures on the LICs, options on the LICs, tranches and intervals. This step is somewhat similar to step 301 of FIG. 3; however, in 1001 emphasis is on creating a series of similar LICs which will be recognized as a series by investors and/or regulators. Inputs into the analysis in 1001 include: input 1003, loss, exposure, and expense data regarding candidate risks for the LICs; input 1005, policies, indexes, contracts, and LICs which are current, outstanding, or are expected to be written over the next several years; and, input 1007, information on underwriters, exchanges, and demand for various LICs and related products. Non-LIC products might be recast as successful LIC products. For example, a series of LICs related to catastrophe futures on the Chicago Board of Trade might be worthy of investigation.

Unlike the process in 301, at step 1001 much attention is given to finding a standard or a series which is sustainable over a period of time. While Year 2000 Computer Risk might have been an appropriate risk to package as an LIC on a one-time basis, it would make very little sense as a series. Any Y2K problems would have occurred over a short period of time; similar computer problems would not be expected to reoccur annually.

The analysis at 1001 will likely take into consideration expected frequency of issuance. For example, a security in a particular series might be expected to issue monthly, quarterly, or annually. There is a vast selection of possible standards and series. Some examples include: quarterly issuance of LICs for Allstate's U.S. personal auto policies; annual issuance of LICs for Wal-Mart workers compensation risk for Wal-Mart employees; monthly issuance of product liability coverage for a specific mix of major automakers; quarterly issuance of LICs for a particular mix of Florida homeowners policies, from a selection of different carriers; the Bermuda Association of LIC Underwriters specifies standards for auto lease residual values LICs, with no requirement regarding issuer or time of issuance; and, monthly issuance of LICs for life insurance policies underwritten by New York Life for nonsmokers, with tranches in the LICs for persons aged 20-29, 30-39, 40-49, 50-59, 60-69, and over 70.

After the analysis in step 1001, specifications for standard(s) and/or series are created in step 1009. In many cases, these standards will be published or circulated to members in advance using output 1011. In some cases, the standards may be kept secret until the first issuance of an LIC in the series. If a series is evolving over time, one or more LICs may be issued before it is realized that a series is developing informally, or that one would be useful. In such a case, output 1011 might not occur until after issuance of one or more LICs, if at all.

At step 1013, a choice is made whether to use some form of shelf registration or one-time registration for the series. In many cases, series of securities are registered for a period of time or on a one-time basis until changed. Futures and options are typically filed with the Commodities Futures Trading Commission on a one-time basis. Registrations for securities regulated by the SEC and sold over a period of up to two years are called shelf registrations under SEC Rule 415. Other regulators, states, and foreign jurisdictions often have similar provisions.

If a shelf registration, one-time registration, or another form of registration of a series is available and desirable, a "yes" advances to step 1015, a single registration or regulatory filing will be used for multiple LICs. The terms of each LIC in the series may be set at offering.

At step 1017, the documents and specifications for multiple LICs, such as a shelf registration, are filed with regulators. At step 1019, LICs in the series are issued. In many cases, the terms are set at or near the issue dates. In some other cases, pricing is set at auction.

If no shelf registration, one time registration, or other form of registration or a series is available or desirable, a "no" advances to step 1021. At 1021 documents for LICs conforming to a standard or in a series are filed one at a time. Such LICs may still be recognized by investors and others as complying with the standard or being part of a series.

XI. Operation of an LIC Exchange—FIG. 11

Figure 11:
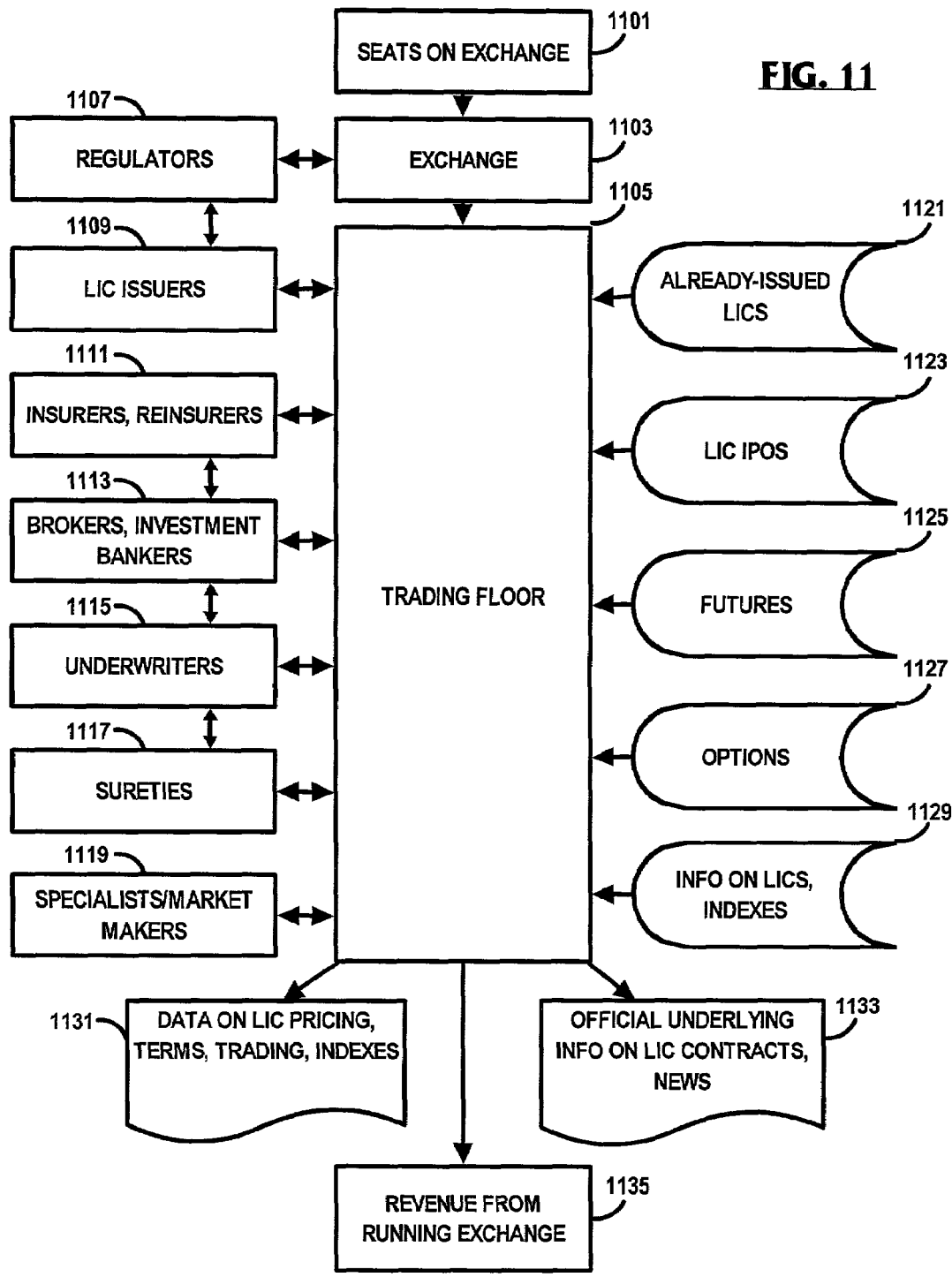
FIG. 11 is a flowchart showing operation of an LIC exchange.

Many features of an LIC exchange, illustrated in FIG. 11, are similar to those of exchanges for stocks, bonds, commodities, futures, or options. However, some aspects of surety/collateral/margin may be considerably different. Agreeing to assume a liability in exchange has some common features with selling options such as commodity options. However, LICs may have features rarely seen with other securities, such as the ability for prices to be either positive or negative.

Seats on the exchange 1101, may be limited or unlimited in number. The ability to trade on the floor will be limited in some way(s) to those who are financially qualified. Most qualifications will be familiar to members of other types of exchanges and might include: certification of trading personnel, background checks, domicile of member, or purchase of a membership seat.

The exchange itself, 1103, can take many forms. Similar to the difference between the New York Stock Exchange and NASDAQ, the LIC Exchange may or may not have a physical location where trading takes place. The exchange might be a public corporation, privately held corporation, general partnership, limited liability corporation, subsidiary of another entity, mutual, or other type of entity. The Exchange interfaces with Regulators 1107 in a manner similar to current securities exchanges. Other regulators may also be involved, such as state insurance regulators, or regulators from non-U.S. locations where the securities are sold or traded.

The Trading Floor, 1105, interfaces with a large number of parties, takes in input from many sources, and provides information on trades. LIC issuers 1109 interface with regulators 1107 and the trading floor 1105. Insurers and reinsurers 1111 are likely to be trading on the exchange, either directly, or through brokers or investment bankers 1113. Brokers and investment bankers may function in a variety of capacities, such as: originating LICs, bundling risks which will compose an LIC, creating LIC derivatives, creating regulatory filings, purchasing all or part of new LIC issues, underwriting LIC issues, advising underwriters 1115 on LIC trades, or trading on their own accounts.

Figure 12:
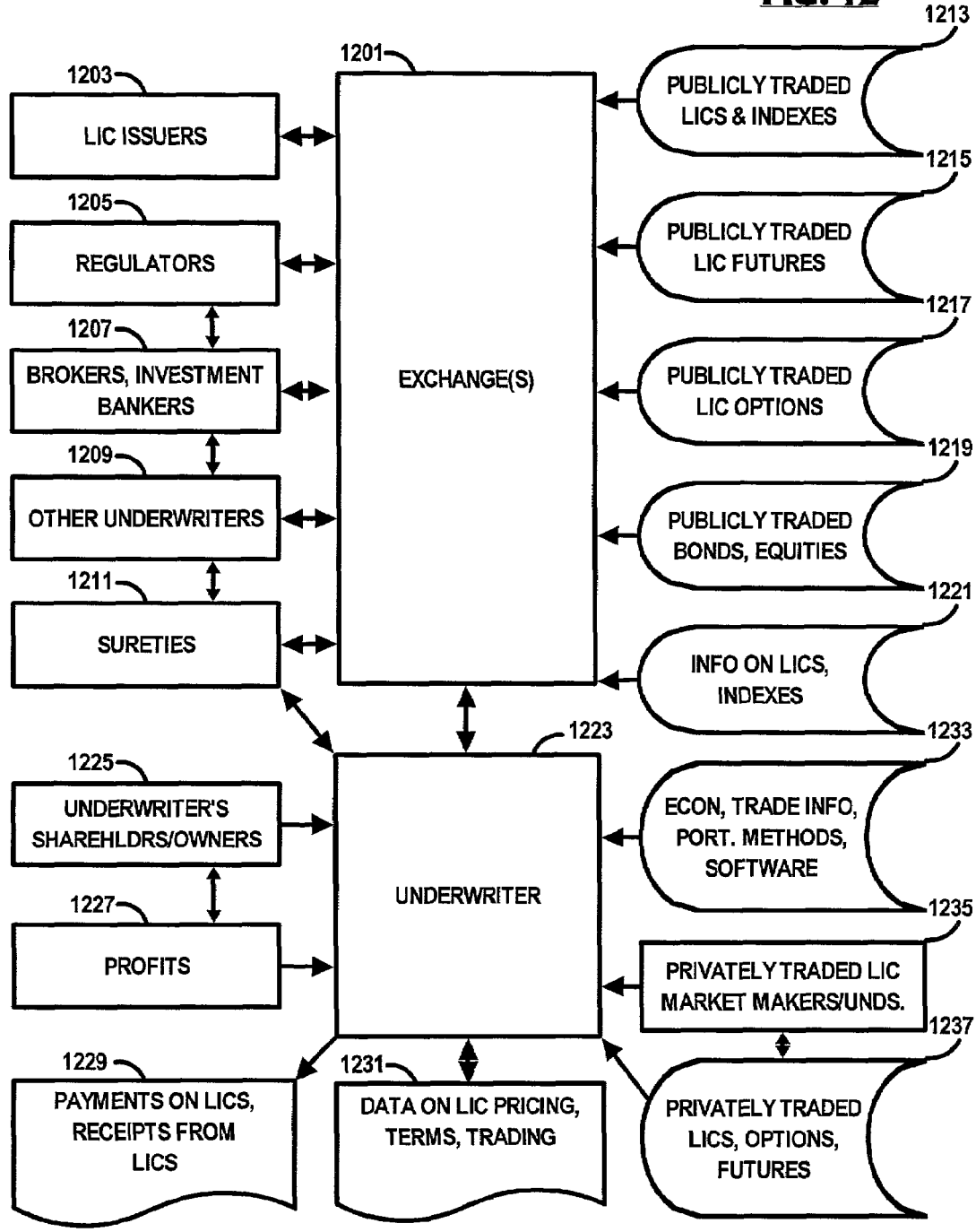
FIG. 12 is a flowchart showing operation of an LIC underwriter.

The functions of underwriters 1115 are described more fully in FIG. 12. Underwriters 1115 trade on the trading floor, interface with one or more sureties 1117 who are guaranteeing payment of LIC obligations, and with brokers and investment bankers 1113. The functions of sureties 1117 are described more fully in FIGS. 13 and 14. Sureties interface with information from the trading floor 1105 and with underwriters 1115.

Specialists and/or market makers 1119 perform a similar function to other exchanges: making sure there is a bid and asked price available on some minimum quantity of LIC shares to any member of the exchange who requests a quote. Because many LICs will be thinly traded, specialists or market makers serve an important role. It is possible to create an LIC exchange without specialists or market makers, but liquidity in many LICs would be poor.

Input 1121, already-issued LICs, trade on the trading floor. LIC IPOs, input 1123, may be initially sold or auctioned via the trading floor. LIC IPOs might also be initially sold elsewhere and be traded on the exchange later as already-issued LICs 1121. Futures 1125 and options 1127 can also trade on the exchange. For regulatory reasons, it is also possible that futures and options would trade on a separate exchange, as is currently the case with stocks and stock options in the U.S.

The exchange may be the official conduit for information related to LICs and indexes, input 1129. For example, if LICs based on a Worldwide Quake Index traded on the Exchange, the Exchange could receive the official value for the index for distribution to its members. As another example, underlying info on the development of LIC liabilities could come from LIC issuers to the exchange.

Just as NASDAQ or the CBOT distribute pricing distribute information on pricing, volume, or terms of various securities, data from the trading floor 1131 is distributed to members and/or the public. Official information underlying LIC contracts 1133 may also be distributed. Such information might include indexes, liabilities or loss information on LICs, news regarding LIC issuers, or margin/collateral requirements.

Just as portfolio management techniques are applied today to portfolios of common stocks and to other portfolios of assets and liabilities, portfolio management techniques can be applied to portfolios of LICs and portfolios that include LICs.

Finally, the exchange will generate revenue 1135. Such revenue may come from a variety of sources, such as charges for executing trades, surety fees, fees for information access, advertising, member seats, memberships, leases, or interest income from collateral on deposit.

XII. Operation of an LIC Underwriter—FIG. 12

LIC underwriters interact with a large number of parties and many sources of information. Many of these interactions are through one or more exchanges 1201, illustrated in FIG. 12. Most of these parties are described in FIG. 11: LIC issuers 1203; regulators 1205; brokers and investment bankers 1207. Other underwriters 1209 includes market makers/specialists, insurers and reinsurers, and other standalone underwriters.

Sureties 1211, may either interact with the exchange(s) 1201, or interact directly with the underwriter 1223. Various surety and collateral arrangements are described in FIGS. 13 and 14. Surety arrangements might be made for all exchange-traded contracts as a whole. In that case, the surety guarantees the performance of any member of the exchange. A second alternative is to have the surety(ies) guarantee all LICs held by a particular underwriter. This is likely the case for nonexchange traded LICs. Third, the surety could be attached to the LIC itself. In that case the surety agreement follows whomever is the current owner of the LIC and it is likely that LIC ownership will be restricted to minimize the surety(ies) losses due to insolvency.

Securities traded by the underwriter via exchange(s) include: publicly traded LICs and LIC indexes1213; publicly traded LIC futures 1215; publicly traded LIC options 1217; and publicly traded bonds and equities 1219. Publicly traded bonds and equities 1219 will typically be used as investment assets to accompany the underwriter's liabilities for LICs. Such stocks and bonds might be traded on different exchanges than LICs; there is no requirement for trading all of the products on the same exchange.

Input 1221 provides information related to LICs and indexes which is disseminated via the exchange(s).

The underwriter 1223 can be many different forms of entity. Many of these are listed in FIG. 21. Depending on the form of the entity, the underwriter has owners and/or direct shareholders 1225. Any profits generated by the underwriter 1227 benefit the shareholders/owners 1225.

At output 1229, each LIC the underwriter owns, has liabilities to pay, or at least the possibility of liabilities to pay. In some cases, the underwriter might also receive funds.

For some LICs, such as a large pool of private passenger auto policies, some losses are virtually guaranteed. For other LICs, such as a tranched hurricane risk LIC, a typical LIC may expire with no payments at all, but occasionally may have very large payments. Index LICs, and LIC futures may have both receipt and payment. LICs which are sold as bundles of assets and liabilities might produce either receipt or payment of funds for the underwriter.

The underwriter will likely use data from its own experience and from others to seek future profitable underwriting opportunities. The underwriter may also provide information regarding pricing, terms and trading to an exchange, regulators or its shareholders at 1231.

Trading, analytic modeling, sensitivity testing, portfolio analysis, and investment analysis may use information from input 1233: economic information, trading information, portfolio management methods, and portfolio management software. For example, the underwriter might adjust its expected fair market value for auto insurance if unemployment rises, since people will drive fewer miles to work. The underwriter might also adjust its portfolio of LICs or assets if interest rates change.

Just as newsletters, and columns in investment dailies, books, and web sites, promote analysts' opinions, conclusions and recommendations with respect to common stocks; these and other means may be used to promote and communicate analysts' opinions, conclusions and recommendations with respect to LICs and underwriters (1221 and 1233, respectively). An entire industry of newsletters might result, with many advisors providing analysis and advice.

Most exchange-traded securities have large markets in related nonexchange-traded securities. This is true for equities, bonds, commodities futures, and options. Privately traded LICs might include a wide variety of transactions: custom-made hedges for LIC exposures, LIC futures with different contract sizes or expiration dates, tranched LICs, small LIC issues which did not merit full regulatory filings for publicly traded LICs, LICs which have been "taken private" by an underwriter, LICs which have been bought up by the surety guaranteeing their performance, or LIC index derivatives. The underwriter might transact in privately traded LICs, options, or futures 1237 directly with other underwriters, or through privately traded LIC market makers 1235.

XIII. Surety and Collateral Arrangements for LICs—FIG. 13

Unlike most other traded securities, LICs involve at least the potential for requiring payment from the buyer. In some respects, exchange-traded LICs behave somewhat like exchange traded options for commodities, equities, or bonds; the party taking risk may have to pay money at some point in the future to another party. However, the LIC seller/issuer is the party reducing its risk and the LIC buyer/underwriter is taking on risk. With options, the option seller is taking on additional risk for an upfront premium and the buyer is reducing his risk and paying an upfront premium.

Thus, some procedures for dealing with credit and payment risks on sellers of options can be adapted to buyers/underwriters of LICs. Considerable analytic and mathematical techniques for option valuation can also be adapted to LICs.

Figure 13:
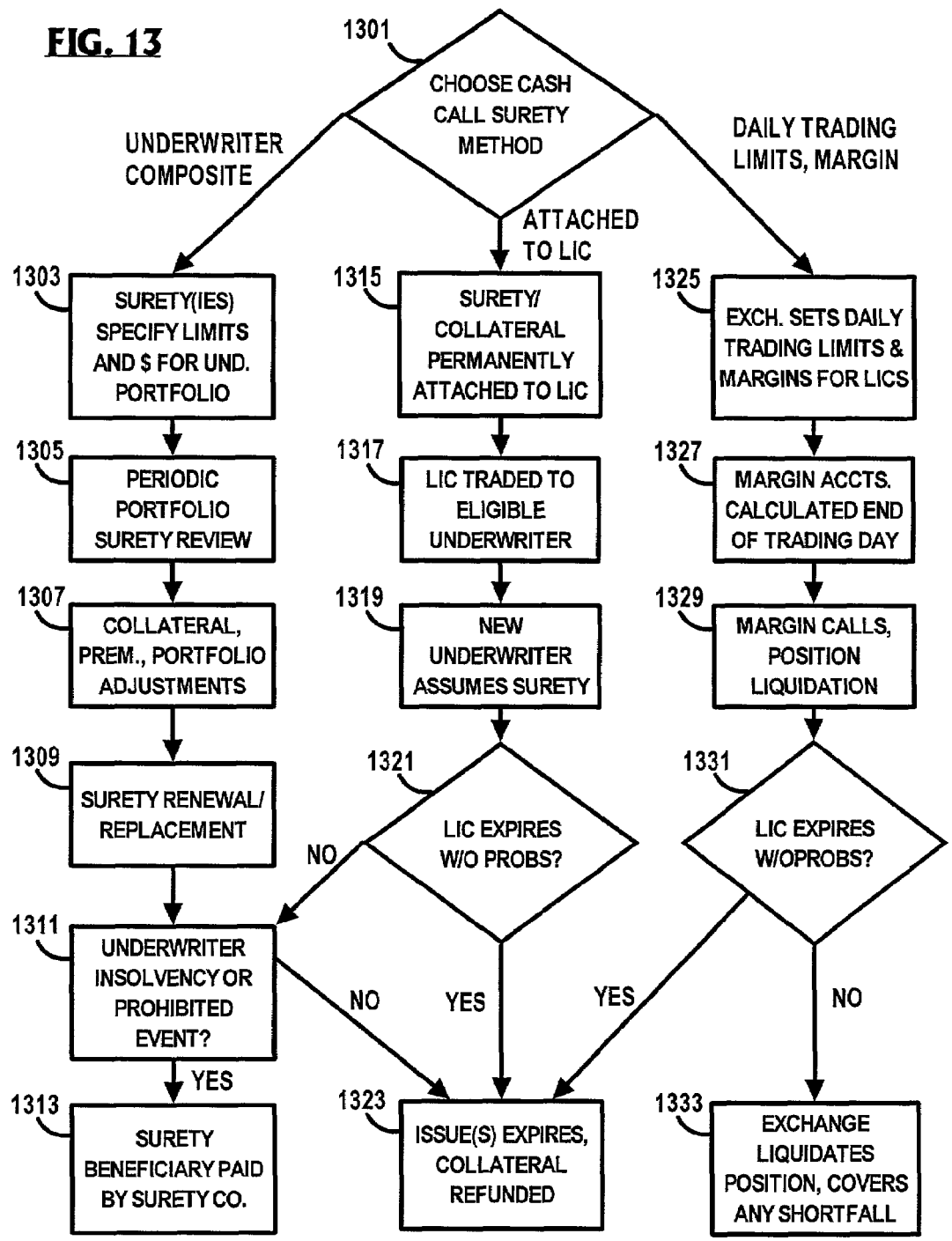
FIG. 13 is a flowchart showing surety or collateral arrangements for LIC contracts.

FIG. 13 is a flowchart showing surety or collateral arrangements for LIC contracts. At step 1301, a surety method is chosen for cash calls from underwriters under the LIC. There are a variety of possible methods of assuring full and timely payment of obligations. If surety arrangements are made on a composite basis for all LICs in an underwriter's portfolio, or a particular group of LICs, "underwriter composite" advances to step 1303. Particular groups which might be covered by an underwriter composite surety include: LICs not covered by surety arrangements from an exchange-sponsored program; LICs not covered by surety arrangements attached to each LIC; and privately placed or privately traded LICs.

At step 1303, one or more surety companies specify parameters for acceptable investment by this underwriter. Such acceptable parameters might vary from one surety company to another, might vary between clients of the same surety company (such as with different underwriter credit ratings), or might vary depending on the surety pricing (e.g., more flexibility or a larger dollar volume).

The surety's obligation with respect to an underwriter(s) may require that the contracts underwritten by the underwriter(s) during the time the surety bond is in force will be performed regardless of the time in the future when such performance might be required. For example, if surety A provides a contract covering underwriter B during calendar year 2002 and one of the LICs underwritten by B has a cash call in 2032, then A is the surety of the performance of that cash call. In one alternative, the strength of those companies permitted to be sureties can be enhanced by requiring each company desiring to act as a surety for an LIC to have in force a surety policy guaranteeing its performance as an LIC surety.

At step 1305, the underwriter's portfolio of LICs covered by the surety or sureties is reviewed and/or recalculated. Such a review might be for portfolio compliance with guidelines, surety premium calculation, or adjustment of collateral. Any necessary adjustments in the portfolio of LICs, premium, or collateral are made in step 1307.

Surety programs might run indefinitely, might follow LICs in the underwriter's portfolio when the surety agreement was in effect until such LICs expire, or might be renewed or replaced periodically. At step 1309 and surety agreements renewal or replacement occurs. It is very likely that LICs will be written with requirements regarding ongoing surety, collateral, or underwriter rating. Thus, it is unlikely that an underwriter can merely cancel surety agreements and remain in compliance with LIC covenants. Surety might be renewed with the same company; run off with the same company covering only existing LICS; moved to another acceptable company; replaced with alternate collateral; be allowed to go without surety because the underwriter's financial rating is high enough; or LICs might be sold, eliminating the requirement for matching surety on those LICs.

There is the potential for underwriters to cease compliance with LIC covenants, have financial-strength rating reductions, insolvency, or regulator takeover. Many of these situations have analogs in banking or insurance, where investments must be liquidated, a higher level of supervision is implemented, the company is sold, or the company itself is liquidated. If such an event occurs at step 1311, a "yes" advances to step 1313, where the surety pays the beneficiary of the surety policy and attempts to make any recoveries later, such as from sale, liquidation or bankruptcy proceedings. The beneficiary may be any of a variety of parties: an LIC issuer, such as an insurance or reinsurance company; an original insurance policyholder whose policy was part of the LIC; a regulator; an exchange or exchange-sponsored clearing facility; or a counterparty, especially in the case of LIC futures or options.

If no insolvencies or prohibited events occur before LIC expiration, a "no" advances to 1323. At step 1323, the LIC issue(s) expires and any collateral is refunded.

A second method of securing LICs, is to attach the surety agreement(s) to the LIC itself. In that case, constraints on eligible underwriters are set by the LIC documents and the surety company for that LIC. At step 1301, a surety agreement "attached to LIC" advances to step 1315. The surety agreement might specify who is eligible to own the LIC and might charge different rates to each owner. However, eligibility, rates and terms would likely be set at issuance. If the surety fees did not vary depending on the underwriter, surety fees might be paid in full at inception. If surety fees vary from one underwriter to the next, a system similar to shareholder of record for equity shares could be used. In the shareholder of record systems for equities, dividends are paid to the owner at particular points in time. In an LIC holder of record system, surety fees would be paid by the LIC holder on specific dates, such as the last trading day of each quarter.

At step 1317, an LIC might be traded from one eligible underwriter to another, or from an underwriter who was no longer in compliance with terms of that LIC to another underwriter who is in compliance. After the trade in 1317, the new underwriter assumes the surety from the LIC agreement in step 1319; the surety "follows" the LIC.

If the LIC expires without problems, a "yes" at 1321 branches to 1323, where the LIC issue(s) expires and any collateral is refunded. If there are problems, a "no" advances to step 1311.

A third method of securing LICs is similar to arrangements for many futures and options exchanges. This method uses margin accounts, and typically also includes daily trading limits on the prices of LICs. If the method of surety at step 1301 is "daily trading limit, margin", advance to 1325. At step 1325, the exchange sets daily trading limits. The daily trading limit is the highest and lowest prices that an LIC, LIC future, or LIC option is permitted to reach in a given trading session. Once reached, no trading occurs on that security until the following session. These limits might be specified for each new LIC separately. The limits might be set in advance for LICs of a particular type or in a particular series. The limits might also be set using one or more mathematical models to estimate volatility of fair market value of the security. Daily limits prevent wild fluctuation in value; such fluctuations are sometimes driven by liquidity problems rather than market economics.

Many exchanges set collateral requirements as a percentage of the daily trading limit. For example, if the daily trading limit is $5 per share, the exchange might demand $5, or an even larger amount, to secure the underwriter's obligation. In a system where margins are calculated and adjusted daily, large accumulations of credit risk have been historically rare. Several commodities exchanges have been in existence for over a century with no defaults which exceeded margin on deposit. An example of the resilience of this type of system is described on the Chicago Mercantile Exchange website:

"In the 100-year history of the Chicago Mercantile Exchange and its predecessor organization, there has never been a failure by a clearing member to pay settlement variation to the Clearing House; there has never been a failure by a clearing member to meet a performance bond call; there has never been a failure by a clearing member to deliver resulting from the exercise or assignment of an option contract; there has never been a failure by a clearing member to meet its delivery obligations; and, there has never been a failure of a clearing member resulting in a loss of customer funds. This system has been remarkably successful in periods of tremendous volatility in the financial markets." from www.cme.com/market/safe.html.

At step 1327 margin, surety, or other performance guarantees are calculated at the end of each trading day. Depending on the securities in an underwriter's portfolio and their price movements, there may be an additional margin call from that underwriter at step 1329. If an underwriter is unable to meet margin calls, their LIC position(s) or other assets may be liquidated. In the great majority of cases, the margin, surety, or other performance guarantees already in place will cover any shortfall. The exchange's clearing facility may also have additional surety in place for any losses not paid for by the member, their margin, or other guarantees.

If an LIC expires without problems at step 1331, a "yes" advances to step 1323, where the issue expires and any collateral is refunded. A "no" at step 1331 advances to step 1333, where shortfalls, including shortfalls at exercise or expiration, are covered using similar methods to step 1329.

XIV. Calculation of Surety or Collateral Amounts for Exchange-traded LIC Contracts—FIG. 14

Figure 14:
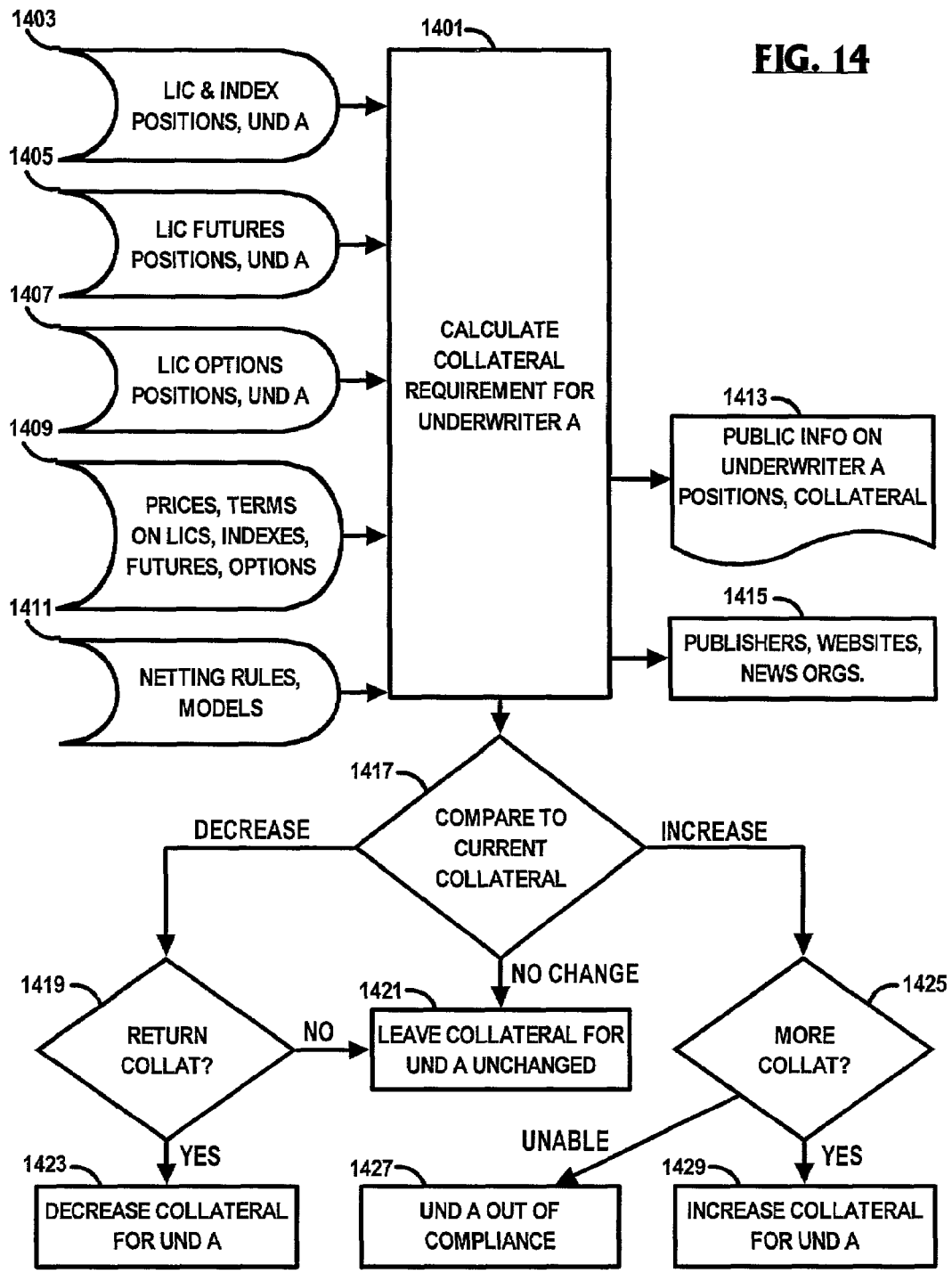
FIG. 14 is a flowchart showing surety or collateral calculations for exchange-traded LIC contracts.

Exchange-traded and nonexchange-traded LICs may have different surety or collateral arrangements and calculations. Surety or collateral calculations for nonexchange-traded contracts are described later in FIG. 18. FIG. 14 is a flowchart showing surety or collateral calculations for exchange-traded LIC contracts.

Collateral requirements at most future and options exchanges are calculated at the end of each trading day. However, the method described in FIG. 14 can easily be adapted to more or less frequent calculations. It is even possible to calculated collateral continuously, or with each trade. For illustrative purposes, we assume that the same calculation methods are used for all underwriters at a particular exchange.

At step 1401, input from many sources is used to calculate the new collateral requirement for an underwriter, in this case Underwriter A. Such sources include: LIC and LIC index positions of Underwriter A, 1403; LIC futures positions of Underwriter A, 1405; LIC options positions of Underwriter A, 1407; and information on prices and terms of LICs, LIC indexes, LIC futures, and LIC options, 1409.

For inputs 1403-1409, it is likely that only exchange traded products are included; privately traded and nonexchange traded products probably are not. This is because it is more difficult to obtain accurate daily pricing information for nonexchange products, and because those products may have different collateral mechanisms. It is however quite reasonable to include information on transactions occurring at multiple exchanges for Underwriter A. For example, Underwriter A may own an LIC traded on Exchange 1 and own a matching put option on the same LIC traded on Exchange 2.

Because some LIC securities may be thinly traded, there may not be a trade in a particular security on a given business day and thus no new closing price to include in step 1409. In such cases, the exchange has many options in setting a closing price for collateral purposes. The most recent trading price might be used, even if it was from a previous trading day. This approach may be useful for contracts with low price volatility. If one or more market makers or specialists trade in that LIC, one or more quotes may be solicited from market makers or specialists to set a closing price, even though no actual trades were executed.

Another approach is to use a proxy or a model to set pricing. If there are one or more other securities which correlate well with the LIC having no trading activity and such other securities have trading activity, a model may be used to set a theoretical price for the LIC in question based on actual trades of other securities. This approach may be particularly successful for LICs in a series.

Input 1411 includes netting rules and one or more models used to calculate collateral. There are a variety of possible netting rules. Netting rules have been in place for many decades at futures and options exchanges, such as the CBOT, the CME and the CBOE. Such rules are well known to those skilled in the art of running futures or options exchanges. Many of the collateral/margin rules for option sellers or traders with futures positions can be easily adapted to positions in LICs, LIC indexes, LIC options, and LIC futures. The underwriter of an LIC has similar obligations and risks to an option seller in the commodities or futures markets.

LICs may have provisions which limit underwriter's maximum liability under the contract. Such limits are similar to the underwriter owning a put option on the LIC and can be taken into account in collateral calculations.

LICs and related futures or options may be traded on different exchanges. In many cases, futures exchanges allow collateral credit for particular securities traded on other exchanges. Similar netting could be allowed with LICs. Partial netting may be useful for LICs in a series. For example, an underwriter might own a June 2001 issue of the Allstate Personal Auto LIC series and sell short a July 2001 issue from the same series. Because the two are highly correlated, collateral might be less than merely selling the July 2001 issue short. Similarly, an Underwriter might own the June 2001 issue and buy a put option on the July 2002 issue and receive some credit toward collateral.

Models used to calculate collateral for futures and options exchanges are well-known to those skilled in the art of running futures or options exchanges. These models vary in complexity, and are typically disclosed to traders and members of the exchange.

After calculating collateral in step 1401, the exchange may report Underwriter A's positions and collateral in step 1413. Such reporting after each trading day may occur for any of several reasons: the LIC exchange may require such reporting as a condition of trading on the exchange; regulators may require such reporting; the LIC underwriter may decide to consent to such reporting for the benefit of the underwriter's owners or shareholders; the LIC underwriter may have such reporting as a requirement written into the underwriter's corporate charter, trust documents, or similar governing documents.

Daily reporting of positions allows investors and potential investors in underwriters to have considerable current and useful information used in valuing the underwriter. Many underwriters will be sole-purpose companies, in many ways similar to real estate investment trusts (REITs) or closed end mutual funds. Mutual funds can have little or no operating income; they can be primarily valued by their investment portfolio. Unlike most mutual funds, LIC underwriters would have substantial liabilities, or at least potential liabilities, due to the LICs they own. However, exchange-traded LICs can be valued at market. If the underwriter transacts solely in exchange-traded products, the market value of the underwriter's stock can be assessed using the market value of its assets and liabilities as a guide.

The underwriter's stock price is unlikely to track exactly with the market value of its assets and liabilities. For example, a very successful underwriter might be expected to continue making intelligent LIC and asset investment decisions, thus producing better returns over time. The market value of such an underwriter could be higher than a similar underwriter with a similar current portfolio, but a worse track record on investments.

The output in step 1413 could be disseminated to investors, potential investors, and the public in various ways in step

1415. For example, the information from 1413 could be: published on an exchange-sponsored website; sent to a publisher or disseminator of information such as Bloomberg, Morningstar, The Wall Street Journal, or The Financial Times of London; sent to the underwriter for distribution by the underwriter; sent to a regulator for distribution by the regulator; sent to an information consolidator who consolidates information from various exchanges and then publishes such information or disseminates it to other parties for publication.

In step 1417, information on underwriter positions and new collateral requirements are compared to current collateral by one or more sureties, exchanges, exchange clearing corporations, or by some other organization which oversees margin, collateral, or performance bonds. If the new collateral is less than current collateral, required collateral decreases. A "decrease" advances to step 1419, where a decision is made regarding returning collateral. In some cases, the underwriter may choose not to reduce its posted collateral. For example, if the required collateral varies considerably from one trading day to the next, the underwriter might often leave more collateral posted than necessary in order to reduce the number of transactions increasing and decreasing posted collateral. In such a case, "no" advances to step 1421, where collateral for Underwriter A is left unchanged.

If the underwriter elects to have part or all of the excess collateral, margin, or performance bond decreased in step 1419, a "yes" advances to step 1423, where Underwriter A's collateral, margin, or performance bond is decreased. If the new collateral is the same as the current collateral, "no change" at step 1417 advances to step 1421, where collateral for Underwriter A is left unchanged.

If the new collateral requirement is higher than the currently posted collateral, "increase" at step 1417 advances to step 1425. In most cases, the underwriter, their surety, or another related party is able to post more collateral in the time frame required. In such cases, "yes" advances to 1429, where Underwriter A's collateral, margin, or performance bond is increased.

In rare cases, Underwriter A may be unable to post more collateral in the time frame required. In that case, "unable" advances to step 1427, where Underwriter A is out of compliance with exchange regulations. Sanctions and steps taken in such cases might include: fines from the exchange; temporary suspension of trading privileges; revocation of trading privileges; forced sale of Underwriter A assets, such as its membership on the exchange or investments in stocks and bonds; exchange or regulator takeover of Underwriter A; activation of separate sureties or guarantees for Underwriter A; surety takeover of Underwriter A; orderly supervised liquidation of Underwriter A or its assets; attempted sale of Underwriter A to a qualified party.

XV. Creating One or More Derivatives from a Single Existing LIC—FIG. 15

Figure 15:
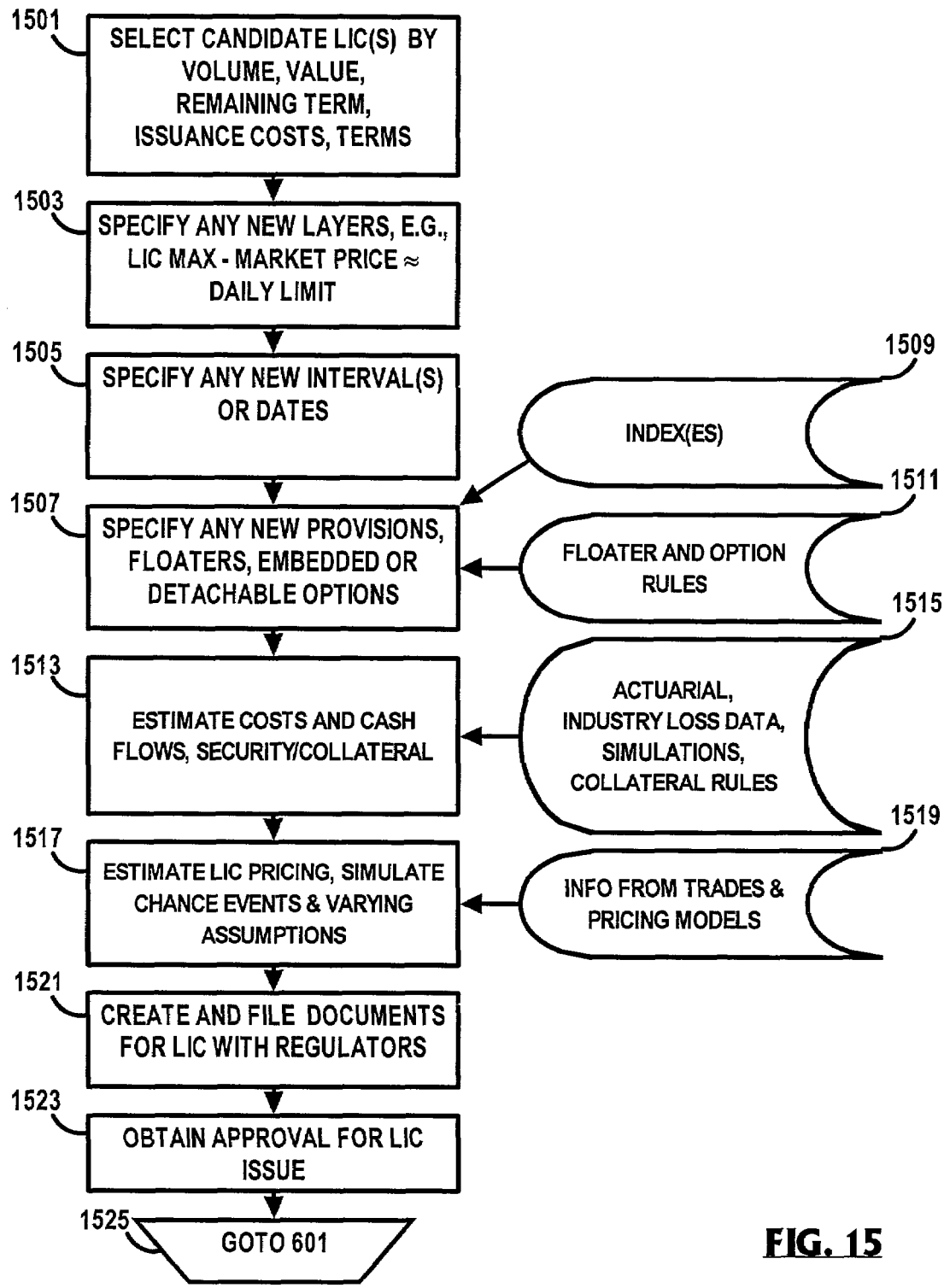
FIG. 15 is a flowchart showing creation of secondary LICs from a single primary LIC.

Derivative financial products are extremely common for most existing securities. It is likely that derivatives will also be created for LICs. FIG. 15 is a flowchart showing creation of secondary LICs from a single original LIC. Common forms of such derivatives might be: tranches, strips, floaters, futures, and options.

Tranches and strips allow underwriters to seek out the portion of the LIC risk which they would like to assume, given attractive pricing. Tranches and strips also provide a mechanism for underwriters with different creditworthiness, credit ratings, or surety arrangements to seek out advantageous portions of the LICs. For example, many corporations will transact only with counterparties rated AAA or AA on multiyear swaps, options or futures. However, these same companies might also transact business with counterparties rated A, or even BBB, on contracts lasting less than one year.

LICs which have assets bundled with LIC liabilities are also candidates for tranching. For example, an LIC contains liabilities for auto insurance bundled with stock in an auto body shop company. Many potential buyers of such and LIC would prefer to sell the body shop stock and invest the proceeds differently. Derivatives might be created which separate the body shop stock from the auto insurance and allow this investment freedom.

At step 1501 one or more LICs for derivatives are selected by evaluating LIC volume, value, remaining term, costs of issuance, and other terms. Other terms might include features not directly part of the LIC, such as the daily trading limit for its price variation on an exchange. In some cases, the LIC to be used for derivatives may already have been selected. For example, this might occur if the entity creating the derivative regularly created similar derivatives for similar LICs. This might also occur at the request of a third party, such as a third party who did not want an LIC with obligations exceeding a particular time frame and requests a derivative breaking the original LIC into strips or short and long term portions.

At step 1503 any new layers for derivatives are specified. For example, the derivatives might be tranches of risk on a portfolio of homeowners' policies. The tranches might be selected by letting each tranch be approximately as deep as the daily trading limit on the original LIC. If the daily trading limit on the original LIC is 5% of its initial price, and the maximum payable under the LIC is twice the original price, there might be as many as 40 tranches (40=200%/5%).

At step 1505 any new intervals or dates are specified. For example, an LIC for life insurance policies might be turned into strips, with one new derivative for each calendar year. Of course, it may be efficient to have larger intervals at some point, such as 5 year intervals beyond 30 years, or all liabilities more than 50 years in the future in a single derivative.

At step 1507 any new provisions such as floaters, embedded options, or detachable options are added. Information on indexes 1509 or floater and option rules 1511 may be used in step 1507.

At step 1513 costs, cash flows, security and/or collateral are calculated for each new derivative. This is similar to step 311 of FIG. 3, except that the analysis is done for each of the new LICs. Actuarial information, industry loss data, simulations, and collateral rules from 1515 are used in step 1513.

Information from 1513 is used, along with data on terms and pricing of recent deals 1519 to estimate LIC pricing in step 1517. Optionally, one or more simulations may be performed in step 1517 to simulate chance events or varying assumptions.

At step 1521 documents for the LIC are created and filed with appropriate regulators. At step 1523 approval is obtained for the LIC. At step 1525, the process branches to step 601 of FIG. 6 to issue shares in the derivative LIC(s).

XVI. Creating One or More Derivatives from Multiple Existing LICs—FIG. 16

It is also possible to create derivatives from multiple existing LICs. Some examples include: bundling many LICs to create a portfolio LIC, such as a Nationwide Auto Insurance LIC which bundles LICs from many different issuers; bundling LICs to reduce the risk of either or both, such as bundling an LIC with an option to limit the exposure to loss and/or collateral requirements; and bundling an LIC with another type of contract, such as bundling an LIC with a currency exchange contract in order to reduce the risk to underwriters who have other investments in foreign currencies.

The aggregation process, designated by the reference numeral 1601 in FIG. 16, is aided by brokers and/or investment bankers 1603, underwriters and exchanges 1605, and sureties 1607.

The only requirement for LIC aggregation is that at least one of the products being aggregated is an LIC, LIC option, LIC future, index LIC, or other form of LIC. Various types of risks and securities may be aggregated together in 1601: privately traded LICs privately traded LIC futures, or privately traded LIC options 1609; non-LIC liabilities with uncertain value or cash flow 1611, such as insurance policies which have not previously been incorporated in an LIC; publicly traded LICs, LIC futures, or LIC options 1613; LIC indexes 1615; publicly traded non-LIC futures 1617, such as a commodity future; publicly traded non-LIC options 1619, such as a stock option; and publicly traded bonds or equities 1621, such as municipal bonds or IBM stock.

In the aggregation process 1601, the entity which will issue the aggregated LIC(s) will own or be liable for the risks and/or securities underlying the aggregated LIC(s). In many cases, the aggregator will own part or all of these before issuing the LIC. In some other cases, they will be purchased before issuance.

It is also possible to own a particular amount of the securities before the issuance, but to keep acquiring more of said securities as demand warrants. This mechanism is typical of mutual funds buying more shares of company stock when investors provide more money to the fund. A mutual fund for traditional equities handle redemptions of mutual fund shares by selling stock in the companies the fund owns. Nothing prevents an LIC aggregator from raising and lowering the outstanding number of LIC shares. In many cases, share redemption will result in the aggregator removing underlying investments. Contrary to the cash flows of a mutual fund investing in company stock, an LIC aggregator would shrink its size by accepting money from underwriters to relieve them of their LIC obligations. The aggregator could then take that cash and buy out part of the aggregator's obligations under the LICs.

At step 1623 the aggregator drafts specifications for one or more new LICs, LIC futures, LIC options, LIC strips, LIC tranches, LIC indexes, LIC market-tracking portfolios, LIC swaps, or floaters. At step 1625, if there will be only one new LIC issue "one" advances to step 1627, which continues the process at step 501 of FIG. 5. "Two or more" LICs advances to step 1629, which continues the process to step 501 of FIG. 5 for each new LIC. If one or more new series of aggregated LICs is being created, "series" advances to step 1631, which continues the process to step 1009 of FIG. 10 for each new series of LICs.

XVII. Secondary Securities Using LICs—FIG. 17

FIG. 17 shows a listing of various types of secondary securities using LICs. There are many types of options which can be used with LICs and LIC derivatives.

XVIII. Lifecycle of an LIC—FIG. 18

FIG. 18 is a flowchart showing the life cycle of an LIC. The party or parties who have one or more risks which might be transferred using LICs have a variety of methods of dealing with such risks. Such parties include individuals, companies, government entities, charities, and various combinations of such parties 1801. One method of transferring liabilities which will ultimately become part of an LIC issue is to purchase insurance from an insurer or reinsurer 1803.

It is expected that LICs issued by insurers and reinsurers will not require consent or notice from the insured to create an LIC issue, starting at step 1805 by selecting the LIC's risks and/or liabilities and servicers. This is analogous to the current situation whereby often insurance is purchased and then the insurer buys reinsurance related to that policy. Illustrative examples of how reinsurance is purchased include: facultative, where the insurer negotiates reinsurance arrangements on a case by case basis; and treaty, where risk is transferred on whole blocks of policies, often including arranging terms for policies which have not yet been written.

The party or parties initially holding the risk, 1801, might also issue one or more LICs directly starting at step 1805. For example, a company which is self insured for workers compensation might issue an LIC for that liability, or a government entity might issue an LIC for terrorist acts on government buildings.

Investment bankers and/or insurance brokers 1807 potentially provide advice and transaction assistance at several steps: selecting risks and/or liabilities and servicers 1805; specifying and creating LICs 1809; and issuing LICs 1813. Step 1809 produces regulatory filings 1811 as an output, such as SEC or CFTC filings.

Step 1813 produces the LICs themselves 1815, and in some cases LIC indexes, LICs options, or LIC futures 1817, which are related to the original or underlying LICs. Some methods for creating such derivative securities are discussed in FIGS. 15 and 16.

Once LICs are issued at step 1813, the LICs trade at 1819. LIC trades involve underwriters 1823, and indirectly the underwriters' shareholders 1821. Underwriters' shareholders are parties involved in maintaining pricing balance between LICs and LIC underwriters, as described in FIG. 19. Trading in exchange-traded LICs involves one or more LIC exchanges 1825. Information on LIC trades, such as price and volume are output at 1827.

In many cases, after an LIC issue has commenced trading secondary LIC issues will be created at step 1829, resulting in tranched LICs and other secondary LICs 1831. Methods for creating secondary LICs are described in FIG. 15.

Underwriters 1823, make any required cash call through an LIC exchange 1825. The cash calls 1833 may be sent through a surety company 1835 to a claims manager 1837 or directly to the claims manager 1837. The claims manager 1837 makes claim payments to claimants at 1839. After the last applicable cash call, an LIC ceases trading at 1841. Various methods of removing LICs from trading are listed in FIG. 24.

XIX. Arbitrage—FIG. 19

FIG. 19 shows arbitrage of underwriter shares and LICs. LICs, LIC derivatives, and LIC underwriters present opportunities for arbitrage, most of which are not available in the traditional insurance market.

Various forms of arbitrage will be possible with LICs, underwriter shares, futures, options, and other related securities. Many arbitrage methods are unusual or impossible with other exchange-traded financial products: cost of issuing LICs<retaining risk or buying insurance 1901; cost of issuing LICs>retaining risk or buying insurance 1903; cost of issuing LICs<retaining risk or buying reinsurance 1905; cost of issuing LICs>retaining risk or buying reinsurance 1907; market price of LIC >risk adjusted price of underlying risk 1909; market price of LIC<risk adjusted price of underlying risk 1911; LIC a share price<LIC b share price, nearly identical risks 1913; and LICs a, b, and c in a series, b is overpriced 1915.

Many arbitrage transactions involving underwriter shares will be familiar to stock traders, bond traders, hedgers, or speculators: LIC a share price<futures price–pv expected cash calls 1917; price LIC floater+price inverse floater<price original LIC 1919; total price of all tranches<price of original LIC 1921; price detachable cat LIC+detachable bond<price cat bond 1923; LIC a option price<LIC b options price, nearly identical risks 1925; Underwriter A net asset value>Underwriter A stock price, adjusted for management fees 1927; Underwriter A net asset value<Underwriter A stock price, adjusted for mgmt fees 1929; and Underwriter A share price/net asset value<Underwriter B share price/net asset value, same mgmt fees 1931.

XX. Sample LIC Deal Summary Page—FIG. 20

FIG. 20 is a sample LIC deal summary page. This is similar to what might be published as a summary for a new stock or bond offering.

XXI. Legal Structures—FIG. 21

FIG. 21 shows many possible legal structures for an LIC entity, forms of obligation, and risks included in LICs. The listing if FIG. 21 is extensive but not exhaustive; other entities, forms of obligation, and risks are possible. Many LICs will have combinations of various types of risks included.

XXII. Forms of Organizations—FIG. 22

FIG. 22 shows exemplary forms of organization for underwriters, and other entities.

XXIII. LICs and Related Cash Flows—FIG. 23 FIG. 23 is a flowchart showing cash flows for LICs and related transactions. Many cash flows occur via the LIC entity and/or its trust or escrow account(s) 2301. Initial premiums for an LIC can come via many sources and paths.

An original riskbearer 2303 might issue LIC directly. One such method is described in FIG. 2. If an original riskbearer is directly issuing an LIC, "LIC premium" can flow directly from the riskbearer 2303 to the LIC account 2301.

In many cases, one or more original riskbearers purchase insurance from traditional insurers 2305. In that case, "insurance premium" flows from the original riskbearer(s) to the insurer. The insurer might issue an LIC, in which case "LIC premium" can flow from the insurer 2305 to the LIC account 2301.

If one or more insurers reinsure any part of their risk with a reinsurer 2307, by paying "reinsurance premium", cash flows from one or more insurers to the reinsurer. The reinsurer might retain the risk, reinsure it elsewhere, or might issue an LIC, in which case "LIC premium" can flow from the reinsurer 2307 to the LIC account 2301.

Note that insurance premium, reinsurance premium and LIC premium do not need to be received in full before LIC shares are issued. Many LICs will be related to policies or risks which are not fully paid or earned by the date of issuance.

Another source of LIC risk is preexisting LICs. As shown in FIGS. 15 and 16, part or all of one or more preexisting LICs owned by underwriters 2309 may be acquired by LIC repackagers 2311. In that case, "LIC premium" flows from the underwriter previously owning the LIC shares to the LIC repackager. The LIC repackager makes one or more new LICs, in which case "LIC premium" can flow from the repackager 2311 to the LIC account 2301.

When LIC shares are sold, such as in an initial offering, "LIC premium" flows from the LIC account 2301 to the new owner. The LICs might be sold or distributed via an LIC exchange 2313, in which case the "LIC premium" flows through the exchange to the underwriter. Alternatively, LICs might be purchased by an underwriter 2315 without going through an exchange; in that case "LIC premium" for an initial offering flows to the underwriter without going through the exchange.

"Cash calls" under the terms of the LIC may flow directly from the underwriter 2315 to the LIC account 2301, flow through a cash call surety or escrow 2317, or be paid via the exchange 2313. If the exchange is formally the counterparty to both the LIC issuer and the LIC underwriter (similar to commodities futures contracts), payment via the exchange 2313 or via the underwriter's surety or escrow 2317 is more likely. Either mechanism provides a greater level of assurance that all LIC cash calls will be received in a timely fashion, regardless of the diligence, financial status, or any disputes between the LIC entity and an individual underwriter.

Cash flows from the LIC account to a number of parties: "fees" to investment bankers or brokers, most likely for initial packaging and sale of LIC shares, or arranging a new LIC entity 2319; policyholder surety fees compensate one or more LIC sureties 2321 for guaranteeing payment from the LIC entity to the claims administrator or claimant.

The LIC account makes payments to any or any combination of the following parties: claims administrator 2323, who may pay claimants 2325; claimants 2325, paid directly from the LIC account; first party LIC payments 2327 can be made to an original riskbearer or policyholder, even if such payments are not consider "claims" in the usual insurance sense, but are agreed amounts, such as is the case with LICs based on an index; or original policyholders 2329. In the case of insolvency or other causes of insufficient or late payments, the LIC surety 2321 may be called upon to make payments in a timely fashion on behalf of the LIC account and attempt any recoveries later.

The underwriter 2315 has many possible cash flows aside from acquiring LICs and paying cash calls under those LICs. The underwriter 2315 may buy or sell LICs where the counterparty is: an LIC exchange 2313; another underwriter 2331; or a market maker or underwriter for privately traded LICs 2333.

The underwriter 2315 is initially capitalized by the underwriters shareholders and/or owners 2335, who provide "paid in capital". Additional capital may be provided over time for various reasons, such as acquiring another fund, expanding operations, or covering losses. The underwriter 2315 may pay "profits or dividends" to the shareholders and/or owners 2335. The underwriter may also provide a "return of capital" to the shareholders and/or owners 2335 in forms such as a stock buyback, a liquidation dividend, or as part of an underwriter takeover or reorganization.

Finally, the underwriter buys various assets from asset sellers 2337. For example, the underwriter may make an "investment" in common stock and municipal bonds hoping to receive a "return" at a later date.

XXIV. Method of Removing LICs from Trading—FIG. 24

FIG. 24 illustrated various methods for removing an LIC from trading.

XXV. Establishing an Underwriter as a Closed End Fund—FIG. 25

Figure 25:
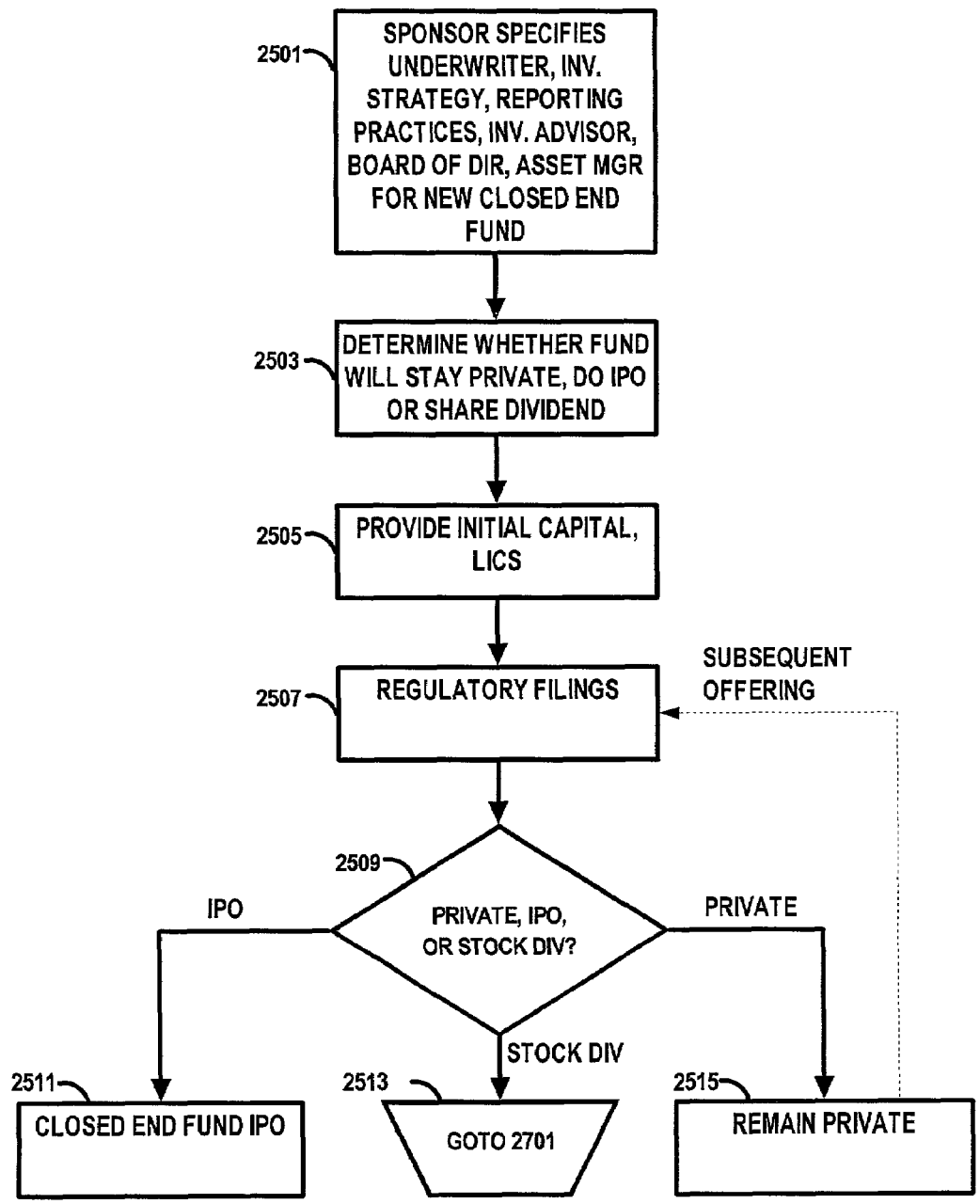
FIG. 25 is a flowchart showing how to establish an underwriter as a closed end fund.
Figure 26:
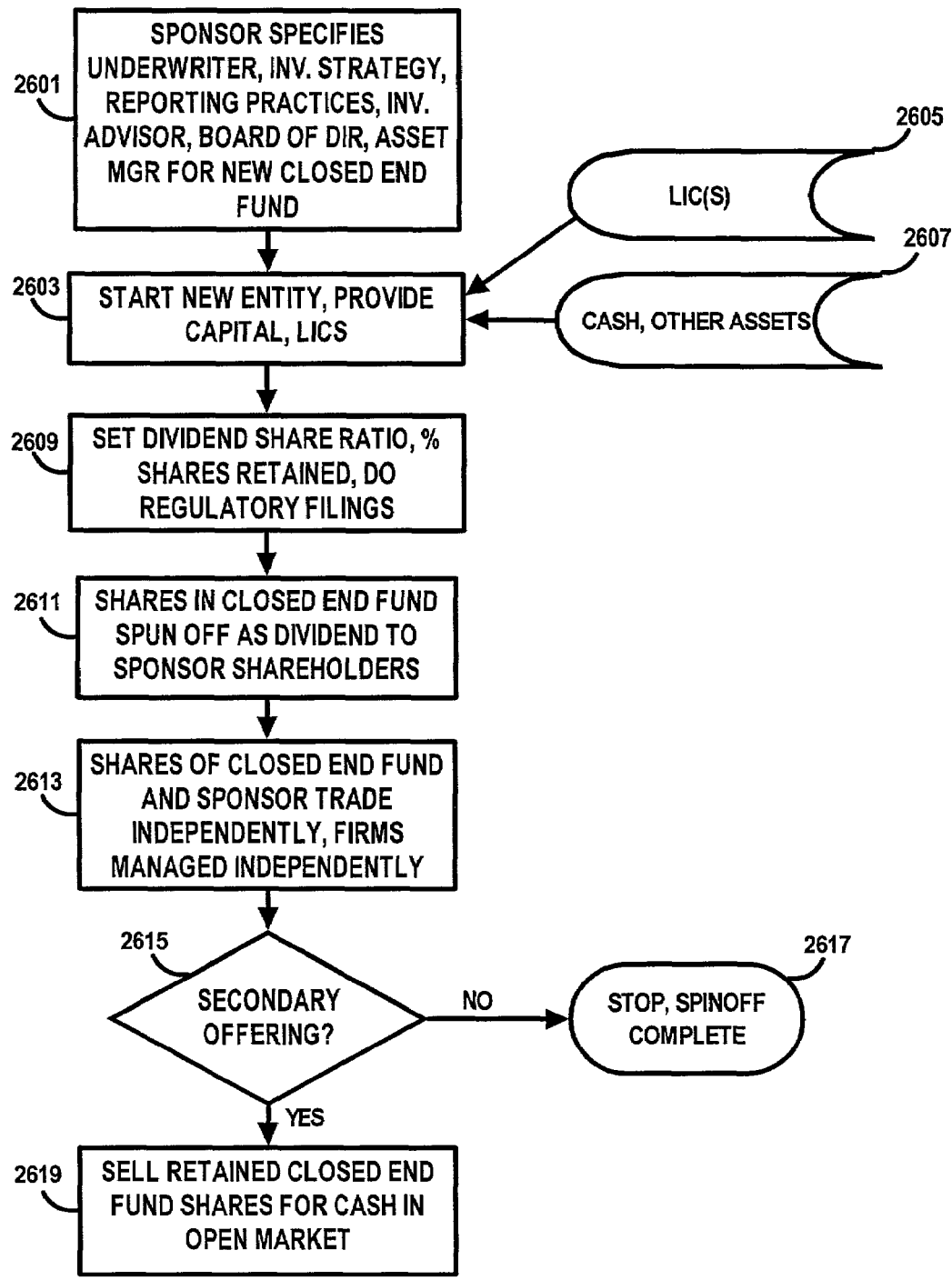

FIG. 25 is a flowchart showing how to establish an underwriter as a closed end fund. There are many possible forms for an LIC entity, as described in FIG. 22. A closed end fund structure has several advantages. Unlike a mutual fund, a closed end fund does not create and redeem shares daily; a closed end fund issues shares which are traded on an exchange. Because many LIC investments are potentially investments with low liquidity, forming an LIC underwriter as a mutual fund could cause problems resulting from high demands for share redemption.

Closed end funds are also typically flow through entities for tax purposes. Under most circumstances, there is no income taxation at the fund level. This provides a competitive advantage for bearing risk in a closed end fund instead of as an operating insurance company.

Many insurance companies and reinsurance companies are managers of mutual funds or closed end funds for investment in assets, such as stock and bonds. Much of this same infrastructure is adaptable for closed end funds specializing in LICs.

At step 2501, the sponsor specifies who will be the initial underwriter, investment advisor, asset manager, and board of directors. The sponsor specifies investment and underwriting policies. Investment policies might include, for example: whether to use leverage, and if so the type and amount; permitted classes of asset investments; and trading practices. The sponsor may also appoint an ongoing investment advisor to manage asset investments.

Underwriting policies might include: geography; line(s) of coverage; layers of coverage; maximum concentration of investments in a particular LIC or group of LICs; trading practices; use of futures or options on LICs; purchase of initial LIC offerings versus issued LICs; which exchange or exchanges to become a member of; underlying currency(ies) of LICs; limits on changes in positions within certain time periods; market pricing versus estimates of losses or simulations of losses; portfolio analysis of LICs versus asset portfolio; and whether to invest in shares of other underwriters. If at least some underwriters can invest in either LICs or the underwriters who own them, this provides opportunities for arbitrage and may help keep market prices of LICs and underwriters in line.

The sponsor may also specify reporting practices. If a closed end fund invests exclusively, or almost exclusively in LICs and publicly traded assets, its net asset value (NAV) can be calculated at the end of each trading day. This is not currently possible with an insurance company. An insurer's liabilities for policies are not marked to market. LICs provide a mechanism to mark insurance liabilities to market. When combined with market values for assets held by the underwriter, NAV can be calculated based entirely, or almost entirely, on publicly available data which is updated frequently. NAVs could be calculated at the end of each trading day. With electronic reporting procedures, NAVs could even be calculated continuously during the trading day. Continuous reporting of underwriter share prices and LIC prices provides ongoing information which can be used for arbitrage and may help keep prices of LICs and underwriter shares in line.

At 2503 a decision is make regarding whether the closed end fund will stay private, go public through and IPO, or be spun off via one or more share dividends. At 2505 initial capital and LICs are provided to the underwriter. The underwriter may operate for some time in this state. At this point, it is a privately held subsidiary. Appropriate regulatory filings for the option selected at step 2503 are made at step 2507. Such regulatory filings are familiar to those skilled in the arts of starting closed end funds and/or spinning off subsidiaries as publicly held companies.

After completion of regulatory filings, at 2509 the process branches to 2511 for an initial public offering of underwriter stock, 2513 if the closed end fund will remain private, or 2515 if the closed end fund will be spun off using a stock dividend. At step 2511 an initial public offering is executed. This process is familiar to investment bankers and closed end fund manager and sponsors. At step 2513 the closed end fund is spun off via a stock dividend. At step 2515 the fund remains private. The fund may remain in this state for months, years, or even the entire life of the fund. At some later date, the fund sponsor may choose to take the closed end fund public using a subsequent offering. In that case, return to step 2507.

We claim:

1. A business method for unbundling the sale, administration, risk transfer and suretyship of an insurance policy, comprising the steps of:
   selling the insurance policy by an insuring company to an insured;
   contracting with a service provider to service the insurance policy;
   issuing a security using a computer or computer network by a security issuing company other than the insuring company that obtains future cash payments in consideration for payments under the insurance policy; and
   providing a surety guarantee by other than the issuing company and the insuring company, for the payment by the issuing company of the cash payments of the security.

2. The business method recited in claim 1 further comprising the step of trading shares of the security issuing company on an exchange.

3. The business method recited in claim 2 wherein the security is a Liquid Insurance Contract.

4. The business method recited in claim 1 wherein the issuing step and the providing step occur without the participation of the insured.

5. The business method recited in claim 1, further comprising trading the security on an exchange.

6. The business method recited in claim 5, wherein the step of trading the security on an exchange further comprises trading the security by qualified underwriters.

7. The business method recited in claim 1, further comprising:
   creating the insurance policy from a previously existing policy form by deleting an exclusion.

8. The business method recited in claim 1, further comprising:
   creating the insurance policy from a previously existing policy form by adding coverage.

9. The business method recited in claim 1, further comprising:
   creating a new policy form.

10. The business method recited in claim 1, wherein providing the surety guarantee comprises issuing a performance bond by a surety company.

11. The business method recited in claim 1, wherein providing the surety guarantee comprises issuing a financial guarantee by a financial guarantee company.

12. A business method for unbundling different elements of an insurance policy, comprising the steps of:
   selling the insurance policy by an insuring company to an insured;
   engaging a service provider to service the insurance policy;
   issuing a security using a computer or computer network by a security issuing company other than the insuring company that obtains future payments in consideration for payments under the insurance policy; and
   providing a surety guarantee by other than the issuing company and the insuring company, for the payment by the issuing company of at least a portion of the future payments of the security.

13. The business method recited in claim 12, wherein providing the surety guarantee comprises issuing a performance bond by a surety company.

14. The business method recited in claim 12, wherein providing the surety guarantee comprises issuing a financial guarantee by a financial guarantee company.

15. The business method recited in claim 12, wherein the security is a LIC.

16. The business method recited in claim 12, wherein the issuing step occurs without the participation of the insured.

17. The business method recited in claim 12, wherein the providing step occurs without the participation of the insured.

18. The business method recited in claim 12, further comprising trading the security on an exchange.

19. The business method recited in claim 18, wherein the step of trading the security on an exchange further comprises trading the security by qualified underwriters.

20. The business method recited in claim 12, wherein the future payments comprise cash.

21. The business method recited in claim 12, further comprising:
creating the insurance policy from a previously existing policy form by deleting an exclusion.

22. The business method recited in claim 12, further comprising:
creating the insurance policy from a previously existing policy form by adding coverage.

23. The business method recited in claim 12, further comprising:
creating a new policy form.

24. A business method for unbundling non-financial functions of a risk transfer contract from a financial risk, comprising the steps of:
creating the contract to transfer risk from a first party to a second party;
contracting with a third party for the non-financial functions of the risk transfer contract;
issuing a security using a computer or computer network by a security issuing company other than the second party that secures future payments for the financial risk; and
providing a surety guarantee by other than the first party and the second party for the payment by the issuing company of the future payments called for by the risk transfer contract.

25. The business method recited in claim 24, wherein the security is a Liquid Insurance Contract.

26. The business method recited in claim 24, wherein the issuing step occurs without participation of the first party.

27. The business method recited in claim 24, wherein the providing step occurs without the participation of the first party.

28. The business method recited in claim 24, further comprising trading the security on an exchange.

29. The business method recited in claim 28, wherein the step of trading the security on an exchange further comprises trading the security by qualified underwriters.

30. The business method recited in claim 24, wherein the creating the contract to transfer risk from the first party to the second party comprises creating coverage for catastrophic loss.

31. The business method recited in claim 24, wherein:
creating the contract to transfer risk from the first party to the second party comprises deleting an exclusion from a previously existing risk transfer contract.

32. The business method recited in claim 24, wherein:
creating the contract to transfer risk from the first party to the second party comprises adding coverage to a previously existing risk transfer contract.

33. The business method recited in claim 24, wherein:
creating the contract to transfer risk from the first party to the second party comprises drafting a new risk transfer contract.

34. The business method recited in claim 24, wherein the future payments comprise cash.

35. The business method recited in claim 24, wherein providing the surety guarantee comprises issuing a performance bond by a surety company.

36. The business method recited in claim 24, wherein providing the surety guarantee comprises issuing a financial guarantee by a financial guarantee company.

37. The method of claim 24, further comprising the steps of:
listing the security on a first exchange;
operating the first exchange;
operating a second exchange; and
permitting as traders on the first exchange underwriters which are listed on the second exchange.

38. The method of claim 37, further comprising:
enabling investors to trade on the second exchange.

39. The method of claim 37, further comprising the step of:
operating the first exchange as a futures exchange.

40. The method of claim 37, further comprising the step of:
operating the first exchange as exempt from regulations that apply to a futures exchange.

41. The method of claim 37, further comprising:
operating the second exchange as a stock exchange.

42. The method of claim 37, further comprising:
requiring a surety guarantee for each trader on the first exchange.

43. The method of claim 42, wherein requiring the surety guarantee comprises issuing a performance bond by a surety company.

44. The method of claim 42, wherein requiring the surety guarantee comprises issuing a financial guarantee by a financial guarantee company.

45. The method of claim 42, wherein effects of counterparty risk on pricing of the security are negligible.

46. The method of claim 37, wherein the step of permitting as the traders on the first exchange comprises excluding as the traders on the first exchange any entities not listed on the second exchange.

47. The method of claim 37, wherein the step of permitting as the traders on the second exchange comprises permitting only accredited investors.

48. The method of claim 37, wherein the step of permitting as the traders on the second exchange comprises permitting at least one business controlled, directly or indirectly, by a reinsurance company.

* * * * *